US012310914B2

(12) United States Patent
McGee et al.

(10) Patent No.: US 12,310,914 B2
(45) **Date of Patent: *May 27, 2025**

(54) METHOD AND SYSTEM OF MECHANICAL NERVE STIMULATION FOR PAIN RELIEF

(71) Applicant: SPR Therapeutics, Inc., Cleveland, OH (US)

(72) Inventors: Meredith McGee, Cary, NC (US); Nathan Crosby, Cleveland, OH (US); John Chae, Strongsville, OH (US); Joseph W. Boggs, Chapel Hill, NC (US)

(73) Assignee: SPR THERAPEUTICS, INC., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/502,131

(22) Filed: Nov. 6, 2023

(65) Prior Publication Data

US 2024/0065931 A1 Feb. 29, 2024

Related U.S. Application Data

(63) Continuation of application No. 18/084,629, filed on Dec. 20, 2022, now Pat. No. 11,806,300, which is a (Continued)

(51) Int. Cl.
*A61H 23/00* (2006.01)
*A61H 39/08* (2006.01)

(52) U.S. Cl.
CPC ......... *A61H 23/006* (2013.01); *A61H 23/004* (2013.01); *A61H 39/08* (2013.01); *A61H 2203/03* (2013.01)

(58) Field of Classification Search
CPC .......... A61H 23/00–06; A61H 2023/002–045; A61H 1/006; A61H 1/008; A61H 1/02; (Continued)

(56) References Cited

U.S. PATENT DOCUMENTS

| | | | |
|---|---|---|---|
| 2,521,722 | A | 9/1950 | Hubbell et al. |
| 3,067,401 | A | 12/1962 | Rhodes |

(Continued)

FOREIGN PATENT DOCUMENTS

| | | | |
|---|---|---|---|
| GB | 0945482 | A | 1/1964 |
| GB | 2085733 | A | 5/1982 |

(Continued)

OTHER PUBLICATIONS

Aktas et al. Therapeutic effect of pulsed electromagnetic field in conservative treatment of subacromial impingement syndrome. Clinical rheumatology. Aug. 2007;26:1234-9.

(Continued)

*Primary Examiner* — Valerie L Woodward
*Assistant Examiner* — Paige Kathleen Bugg
(74) *Attorney, Agent, or Firm* — McDonald Hopkins LLC

(57) ABSTRACT

A system and method of using a lead introduced to a subject proximate to a region of pain is contemplated to deliver pain relief without the need for multiple needle insertions or electrical stimulation. The three-dimensional lead may include spring-like characteristics and/or coils to translate mechanical energy into the therapy.

13 Claims, 14 Drawing Sheets

Related U.S. Application Data continuation of application No. 15/790,564, filed on Oct. 23, 2017, now Pat. No. 11,540,973.

(60) Provisional application No. 62/411,068, filed on Oct. 21, 2016.

(58) Field of Classification Search
CPC .. A61H 1/0237–0296; A61H 2001/027; A61H 2001/0233; A61H 39/00–086; A61H 2039/005; A61H 99/00; A61H 2205/00–125; A61M 37/00–0093; A61M 2037/0007–0061; A61M 29/00–02; A61M 25/00–104; A61M 2025/0001–1097; A61M 5/00–52; A61M 2005/004–5093; A61N 1/0456; A61N 1/05–0504
USPC ............................................................ 601/97
See application file for complete search history.

(56) References Cited

U.S. PATENT DOCUMENTS

| | | | | |
|---|---|---|---|---|
| 3,568,675 | A | 3/1971 | Harvey | |
| 3,663,965 | A | 5/1972 | Lee, Jr. et al. | |
| 3,701,080 | A | 10/1972 | Baisz et al. | |
| 3,850,161 | A | 11/1974 | Liss | |
| 3,964,470 | A | 6/1976 | Trombley | |
| 4,019,518 | A | 4/1977 | Maurer et al. | |
| 4,026,301 | A | 5/1977 | Friedman et al. | |
| 4,144,889 | A | 3/1979 | Tyers et al. | |
| 4,223,679 | A | 9/1980 | Schulman et al. | |
| 4,250,882 | A | 2/1981 | Adair | |
| 4,262,672 | A | 4/1981 | Kief | |
| 4,281,660 | A | 8/1981 | Fujiwara | |
| 4,281,664 | A | 8/1981 | Duggan | |
| 4,326,534 | A | 4/1982 | Axelgaard et al. | |
| 4,408,608 | A | 10/1983 | Daly et al. | |
| 4,409,994 | A | 10/1983 | Doring | |
| 4,413,314 | A | 11/1983 | Slater et al. | |
| 4,453,162 | A | 6/1984 | Money et al. | |
| 4,459,989 | A | 7/1984 | Borkan | |
| 4,508,119 | A | 4/1985 | Tukamoto | |
| 4,528,984 | A | 7/1985 | Morawetz et al. | |
| 4,528,987 | A | 7/1985 | Slocum | |
| 4,532,932 | A | 8/1985 | Batty, Jr. | |
| 4,558,704 | A | 12/1985 | Petrofsky | |
| 4,561,443 | A | 12/1985 | Hogrefe et al. | |
| 4,561,445 | A | 12/1985 | Berke et al. | |
| 4,569,352 | A | 2/1986 | Petrofsky et al. | |
| 4,579,120 | A | 4/1986 | MacGregor | |
| 4,586,510 | A | 5/1986 | Glaser et al. | |
| 4,595,010 | A | 6/1986 | Radke | |
| 4,622,973 | A | 11/1986 | Agarwala | |
| 4,632,116 | A | 12/1986 | Rosen et al. | |
| 4,639,667 | A | 1/1987 | Andresen | |
| 4,640,983 | A | 2/1987 | Comte | |
| 4,645,504 | A | 2/1987 | Byers | |
| 4,662,363 | A | 5/1987 | Romano et al. | |
| 4,690,145 | A | 9/1987 | King-Smith et al. | |
| 4,693,254 | A | 9/1987 | Mickiewicz et al. | |
| 4,699,143 | A | 10/1987 | Dufresne et al. | |
| 4,793,353 | A | 12/1988 | Borkan | |
| 4,942,514 | A | 7/1990 | Miyagaki et al. | |
| 4,990,258 | A | 2/1991 | Bjare et al. | |
| 5,036,862 | A | 8/1991 | Pohndorf | |
| 5,063,929 | A | 11/1991 | Bartelt et al. | |
| 5,067,495 | A | 11/1991 | Brehm | |
| 5,167,229 | A | 12/1992 | Peckham et al. | |
| 5,247,434 | A | 9/1993 | Hogard et al. | |
| 5,285,781 | A | 2/1994 | Brodard | |
| 5,300,096 | A | 4/1994 | Hall et al. | |
| 5,330,515 | A | 7/1994 | Rutecki et al. | |
| 5,571,162 | A | 11/1996 | Lin | |
| 5,581,687 | A | 12/1996 | Lyle et al. | |
| 5,609,770 | A | 3/1997 | Zimmerman et al. | |
| 5,653,887 | A | 8/1997 | Wahl et al. | |
| 5,702,428 | A | 12/1997 | Tippey et al. | |
| 5,776,178 | A | 7/1998 | Pohndorf et al. | |
| 5,792,187 | A | 8/1998 | Adams | |
| 5,800,458 | A | 9/1998 | Wingrove | |
| 5,830,151 | A | 11/1998 | Hadzic et al. | |
| 5,836,995 | A | 11/1998 | Mcgraw et al. | |
| 5,861,017 | A | 1/1999 | Smith et al. | |
| 5,871,532 | A | 2/1999 | Schroeppel | |
| 5,873,900 | A | 2/1999 | Maurer et al. | |
| 5,948,007 | A | 9/1999 | Starkebaum et al. | |
| 5,983,140 | A | 11/1999 | Smith et al. | |
| RE36,690 | E | 5/2000 | McGraw et al. | |
| 6,058,938 | A | 5/2000 | Chu et al. | |
| 6,104,957 | A | 8/2000 | Alo et al. | |
| 6,163,725 | A | 12/2000 | Peckham et al. | |
| 6,167,304 | A | 12/2000 | Loos | |
| 6,315,721 | B2 | 11/2001 | Schulman et al. | |
| 6,355,025 | B1 | 3/2002 | Phipps et al. | |
| 6,381,496 | B1 | 4/2002 | Meadows et al. | |
| 6,440,094 | B1 | 8/2002 | Maas | |
| 6,454,758 | B1 | 9/2002 | Thompson et al. | |
| 6,461,357 | B1 | 10/2002 | Sharkey et al. | |
| 6,530,954 | B1 | 3/2003 | Eckmiller | |
| 6,600,954 | B2 | 7/2003 | Cohen et al. | |
| 6,609,031 | B1 | 8/2003 | Law et al. | |
| 6,613,014 | B1 | 9/2003 | Chi | |
| 6,671,544 | B2 | 12/2003 | Baudino | |
| 6,735,475 | B1 | 5/2004 | Whitehurst et al. | |
| 6,783,504 | B1 | 8/2004 | Xie | |
| 6,821,154 | B1 | 11/2004 | Canfield et al. | |
| 6,845,271 | B2 | 1/2005 | Fang et al. | |
| 7,079,882 | B1 | 7/2006 | Schmidt | |
| 7,187,982 | B2 | 3/2007 | Seifert et al. | |
| 7,239,918 | B2 | 7/2007 | Strother et al. | |
| 7,242,983 | B2 | 7/2007 | Frei et al. | |
| 7,302,296 | B1 | 11/2007 | Hoffer | |
| 7,324,853 | B2 | 1/2008 | Ayal et al. | |
| 7,337,005 | B2 | 2/2008 | Kim et al. | |
| 7,359,751 | B1 | 4/2008 | Erickson et al. | |
| 7,369,894 | B2 | 5/2008 | Gerber | |
| 7,373,204 | B2 | 5/2008 | Gelfand et al. | |
| 7,562,188 | B2 | 7/2009 | Cavallo | |
| 7,613,519 | B2 | 11/2009 | De Ridder | |
| 7,720,548 | B2 | 5/2010 | King | |
| 7,761,166 | B2 | 7/2010 | Giftakis et al. | |
| 7,792,591 | B2 | 9/2010 | Rooney et al. | |
| 7,810,571 | B2 | 10/2010 | Beall | |
| 7,848,821 | B1 | 12/2010 | Ryu et al. | |
| 7,945,330 | B2 | 5/2011 | Gliner et al. | |
| 7,949,395 | B2 | 5/2011 | Kuzma | |
| 8,103,341 | B2 | 1/2012 | Libbus et al. | |
| 8,204,607 | B2 | 6/2012 | Rooney et al. | |
| 8,239,029 | B2 | 8/2012 | De Ridder | |
| 8,249,713 | B2 | 8/2012 | Fang et al. | |
| 8,313,339 | B2 | 11/2012 | Monier | |
| 8,380,298 | B2 | 2/2013 | Chi | |
| 8,463,383 | B2 | 6/2013 | Sakai et al. | |
| 8,626,302 | B2 | 1/2014 | Bennett et al. | |
| 8,644,941 | B2 | 2/2014 | Rooney et al. | |
| 8,700,177 | B2 | 4/2014 | Strother et al. | |
| 8,788,046 | B2 | 7/2014 | Bennett et al. | |
| 8,788,047 | B2 | 7/2014 | Bennett et al. | |
| 8,788,048 | B2 | 7/2014 | Bennett et al. | |
| 8,886,337 | B2 | 11/2014 | Bennett et al. | |
| 8,954,153 | B2 | 2/2015 | Boggs, II | |
| 8,965,516 | B2 | 2/2015 | Bennett et al. | |
| 9,381,343 | B2 | 7/2016 | Bennett et al. | |
| 11,540,973 | B2 * | 1/2023 | McGee ................ | A61H 23/004 |
| 11,806,300 | B2 * | 11/2023 | McGee ................ | A61H 23/004 |
| 2001/0018606 | A1 | 8/2001 | Ingle et al. | |
| 2002/0068930 | A1 | 6/2002 | Tasto et al. | |
| 2002/0099419 | A1 | 7/2002 | Cohen et al. | |
| 2003/0078633 | A1 | 4/2003 | Firlik et al. | |
| 2003/0100933 | A1 | 5/2003 | Ayal et al. | |
| 2003/0130706 | A1 | 7/2003 | Sheffield et al. | |
| 2003/0225361 | A1 | 12/2003 | Sabra | |
| 2003/0229360 | A1 | 12/2003 | Gayton | |
| 2004/0015204 | A1 | 1/2004 | Whitehurst et al. | |

(56) References Cited

U.S. PATENT DOCUMENTS

| | | | |
|---|---|---|---|
| 2004/0122482 | A1 | 6/2004 | Tung et al. |
| 2004/0186532 | A1 | 9/2004 | Tadlock |
| 2004/0260312 | A1 | 12/2004 | Magnusson et al. |
| 2005/0010259 | A1 | 1/2005 | Gerber |
| 2005/0105201 | A1 | 5/2005 | Christie, Jr. et al. |
| 2005/0143789 | A1 | 6/2005 | Whitehurst et al. |
| 2005/0149154 | A1 | 7/2005 | Cohen et al. |
| 2005/0182469 | A1 | 8/2005 | Hunter et al. |
| 2005/0240243 | A1 | 10/2005 | Barolat et al. |
| 2005/0246006 | A1 | 11/2005 | Daniels |
| 2006/0069415 | A1 | 3/2006 | Cameron et al. |
| 2006/0095088 | A1 | 5/2006 | De Ridder |
| 2006/0173507 | A1 | 8/2006 | Mrva et al. |
| 2006/0195170 | A1 | 8/2006 | Cohen et al. |
| 2006/0206166 | A1 | 9/2006 | Weiner |
| 2007/0021786 | A1 | 1/2007 | Parnis et al. |
| 2007/0021803 | A1 | 1/2007 | Deem et al. |
| 2007/0027501 | A1 | 2/2007 | Jensen et al. |
| 2007/0027514 | A1 | 2/2007 | Gerber |
| 2007/0072256 | A1 | 3/2007 | Makings et al. |
| 2007/0073356 | A1 | 3/2007 | Rooney et al. |
| 2007/0073357 | A1 | 3/2007 | Rooney et al. |
| 2007/0150034 | A1 | 6/2007 | Rooney et al. |
| 2007/0213771 | A1 | 9/2007 | Spinner et al. |
| 2007/0219547 | A1 | 9/2007 | Osypka |
| 2007/0244522 | A1 | 10/2007 | Overstreet |
| 2007/0255340 | A1 | 11/2007 | Giftakis et al. |
| 2007/0255365 | A1 | 11/2007 | Gerber et al. |
| 2007/0255368 | A1 | 11/2007 | Bonde et al. |
| 2008/0033511 | A1 | 2/2008 | Dobak |
| 2008/0065171 | A1 | 3/2008 | Fang et al. |
| 2008/0132982 | A1 | 6/2008 | Gerber |
| 2008/0228241 | A1 | 9/2008 | Sachs |
| 2009/0099439 | A1 | 4/2009 | Barolat |
| 2009/0192567 | A1 | 7/2009 | Armstrong et al. |
| 2009/0221928 | A1 | 9/2009 | Einav et al. |
| 2009/0281594 | A1 | 11/2009 | King et al. |
| 2009/0326613 | A1 | 12/2009 | Knoblich |
| 2010/0030300 | A1 | 2/2010 | Feler et al. |
| 2010/0036280 | A1 | 2/2010 | Ballegaard et al. |
| 2010/0036445 | A1 | 2/2010 | Sakai et al. |
| 2010/0036454 | A1* | 2/2010 | Bennett .................... A61N 1/05 607/46 |
| 2010/0082087 | A1 | 4/2010 | Silipo et al. |
| 2010/0152808 | A1 | 6/2010 | Boggs, II |
| 2010/0152809 | A1 | 6/2010 | Boggs, II |
| 2010/0280576 | A1 | 11/2010 | Gerber et al. |
| 2010/0331883 | A1 | 12/2010 | Schmitz et al. |
| 2011/0021943 | A1 | 1/2011 | Lacour et al. |
| 2011/0022114 | A1 | 1/2011 | Navarro |
| 2011/0054565 | A1 | 3/2011 | Wacnik et al. |
| 2011/0106207 | A1 | 5/2011 | Cauller et al. |
| 2011/0208266 | A1 | 8/2011 | Minogue et al. |
| 2011/0213221 | A1 | 9/2011 | Roche |
| 2011/0224665 | A1 | 9/2011 | Crosby et al. |
| 2011/0301670 | A1 | 12/2011 | Gross et al. |
| 2012/0016439 | A1 | 1/2012 | Alataris et al. |
| 2012/0035685 | A1 | 2/2012 | Saha et al. |
| 2012/0197388 | A1 | 8/2012 | Khairkhahan et al. |
| 2012/0232615 | A1 | 9/2012 | Barolat et al. |
| 2012/0271391 | A1 | 10/2012 | Barolat |
| 2012/0290055 | A1* | 11/2012 | Boggs ................ A61N 1/36071 607/116 |
| 2012/0310301 | A1* | 12/2012 | Bennett .............. A61N 1/36021 607/46 |
| 2012/0310302 | A1 | 12/2012 | Bennett et al. |
| 2012/0310314 | A1 | 12/2012 | Bennett et al. |
| 2013/0013041 | A1 | 1/2013 | Glukhovsky et al. |
| 2013/0018445 | A1 | 1/2013 | Sakai et al. |
| 2013/0066393 | A1 | 3/2013 | Gross et al. |
| 2013/0096641 | A1 | 4/2013 | Strother et al. |
| 2013/0110196 | A1 | 5/2013 | Alataris et al. |
| 2013/0197615 | A1 | 8/2013 | Rundle et al. |
| 2013/0238066 | A1 | 9/2013 | Boggs, II et al. |
| 2013/0296966 | A1 | 11/2013 | Wongsarnpigoon et al. |
| 2014/0046416 | A1 | 2/2014 | Bennett et al. |
| 2014/0107747 | A1 | 4/2014 | Rooney et al. |
| 2014/0114374 | A1 | 4/2014 | Rooney et al. |
| 2014/0288616 | A1 | 9/2014 | Rawat et al. |
| 2014/0330339 | A1 | 11/2014 | Bennett et al. |
| 2015/0182749 | A1 | 7/2015 | Fang et al. |
| 2015/0224251 | A1 | 8/2015 | Rooney et al. |
| 2018/0110677 | A1 | 4/2018 | McGee et al. |
| 2023/0135669 | A1 | 5/2023 | McGee et al. |

FOREIGN PATENT DOCUMENTS

| | | | |
|---|---|---|---|
| GB | 2123698 | A | 2/1984 |
| GB | 2223949 | A | 4/1990 |
| GB | 2423020 | A | 8/2006 |
| WO | 2005105201 | A2 | 11/2005 |
| WO | 2006057734 | A1 | 6/2006 |
| WO | 2007136726 | A2 | 11/2007 |
| WO | 2010014260 | A1 | 2/2010 |
| WO | 2010044880 | A1 | 4/2010 |
| WO | 2012075265 | A1 | 6/2012 |
| WO | 2012075281 | A1 | 6/2012 |
| WO | 2012075299 | A1 | 6/2012 |
| WO | 2012075497 | A1 | 6/2012 |
| WO | 2013036630 | A1 | 3/2013 |
| WO | 2014099423 | A1 | 6/2014 |

OTHER PUBLICATIONS

Baffes et al. "Shoulder Impingement Syndrome," Jul. 1998. Retrieved from the Internet: <URL: https://ftp.uws.edu/udocs/public/CSPE_Protocols_and_Care_Pathways/Care0Pathways/Shoulder_Impingement_Syndrome.pdf>, 87 pages.

Bates et al. Veterans Affairs/Department of Defense Clinical Practice Guideline for the Management of Adult Stroke Rehabilitation Care: executive summary. Stroke. Sep. 2005;369:2049-56.

Bernstein et al. Spinal cord stimulation in conjunction with peripheral nerve field stimulation for the treatment of low back and leg pain: a case series. Neuromodulation: Technology at the Neural Interface. Apr. 1, 2008;112:116-23.

Bhadra et al. Extraction forces and tissue changes during explant of CWRU-type intramuscular electrodes from rat gastrocnemius. Annals of biomedical engineering. Nov. 1997;25:1017-25.

Bhakta et al. Use of botulinum toxin in stroke patients with severe upper limb spasticity. Journal of Neurology, Neurosurgery & Psychiatry. Jul. 1, 1996;611:30-5.

Bigeleisen et al. Extraneural versus intraneural stimulation thresholds during ultrasound-guided supraclavicular block. The Journal of the American Society of Anesthesiologists. Jun. 1, 2009;1106:1235-43.

Bohannon et al. Shoulder pain in hemiplegia: statistical relationship with five variables. Archives of physical medicine and rehabilitation. Aug. 1, 1986;678:514-6.

Brooke et al. Shoulder subluxation in hemiplegia: effects of three different supports. Archives of physical medicine and rehabilitation. Jul. 1, 1991;728:582-6.

Buckett et al. Shoulder position control: An alternative control technique for motion impaired individuals. InProc. Int. Conf. Rehab. Eng. Jun. 1980 pp. 244-247.

Caldwell et al. A percutaneous wire electrode for chronic research use. IEEE Transactions on Biomedical Engineering. Sep. 5, 1975:429-32.

Chae et al. Neuromuscular stimulation for upper extremity motor and functional recovery in acute hemiplegia. Stroke. May 1998:295:975-9.

Crago et al. Closed-loop control of force during electrical stimulation of muscle. IEEE transactions on biomedical engineering. Jun. 6, 1980:306-12.

Crago PE. Control of movements by functional neuromuscular stimulation. IEEE Engineering in Medicine and Biology Magazine. Sep. 1983;23:32-6.

David et al. Comparing stimulation-induced pain during percutaneous (intramuscular) and transcutaneous neuromuscular electric stimu-

(56) References Cited

OTHER PUBLICATIONS lation for treating shoulder subluxation in hemiplegia. Archives of physical medicine and rehabilitation. Jun. 1, 2001;82(6):756-60.
David et al. Intramuscular neuromuscular electric stimulation for poststroke shoulder pain: a multicenter randomized clinical trial. Archives of physical medicine and rehabilitation. May 1, 2004;85(5):695-704.
David et al. Percutaneous intramuscular neuromuscular electric stimulation for the treatment of shoulder subluxation and pain in patients with chronic hemiplegia: a pilot study. Archives of physical medicine and rehabilitation. Jan. 1, 2001;82(1):20-5.
Extended European Search Report in EP13758002.3, mailed Sep. 9, 2015, 9 pages.
Extended European Search Report in EP13760774.3, mailed Jan. 5, 2016, 11 pages.
Extended European Search Report in EP13866258.0, mailed Sep. 5, 2016, 6 pages.
Forster IC. Theoretical design and implementation of a transcutaneous, multichannel stimulator for neural prosthesis applications. Journal of Biomedical Engineering. Apr. 1, 1981;3(2):107-20.
Green et al. Systematic review of randomised controlled trials of interventions for painful shoulder: selection criteria, outcome assessment, and efficacy. Bmj. Jan. 31, 1998;316(7128):354-60.
Griffin et al. Strapping the hemiplegic shoulder prevents development of pain during rehabilitation: a randomized controlled trial. Clinical rehabilitation. Apr. 2006;20(4):287-95.
Gybels et al. The Treatment of Pain Due to Peripheral-Nerve Injury by Electrical-Stimulation of the Injured Nerve. Advances in pain research and therapy. Jan. 1, 1990;13:217-22.
Hanger et al. A randomized controlled trial of strapping to prevent post-stroke shoulder pain. Clinical rehabilitation. Aug. 2000;14(4):370-80.
International Preliminary Report on Patentability in PCT/US2009/006414, mailed Jan. 7, 2011, 5 pages.
International Preliminary Report on Patentability in PCT/US2011/062906, mailed Dec. 6, 2012, 9 pages.
International Search Report and Written Opinion in PCT/US2009/006403, mailed Feb. 23, 2010, 6 pages.
International Search Report and Written Opinion in PCT/US2011/062857, mailed Mar. 9, 2012, 8 pages.
International Search Report and Written Opinion in PCT/US2011/062882, mailed Mar. 15, 2012, 8 pages.
International Search Report and Written Opinion in PCT/US2011/062906, mailed Mar. 30, 2012, 10 pages.
International Search Report and Written Opinion in PCT/US2012/053952, mailed Nov. 15, 2012, 8 pages.
International Search Report and Written Opinion in PCT/US2013/073647, mailed Feb. 20, 2014, 11 pages.
International Search Report and Written Opinion in PCT/US2016/057267, mailed Mar. 24, 2017, 43 pages.
International Search Report and Written Opinion in PCT/US2017/048904, mailed Oct. 27, 2017, 11 pages.
International Search Report in PCT/US2009/006414, mailed Feb. 3, 2010, 4 pages.
Knutson et al. Electrode fracture rates and occurrences of infection and granuloma associated with percutaneous intramuscular electrodes in upper-limb functional electrical stimulation applications. Journal of Rehabilitation Research & Development. Nov. 1, 2002;39(6).
Krainick et al. Spinal cord stimulation in post-amputation pain. Surgical Neurology. Jul. 1, 1975;4(1):167-70.
Krupp et al. Long head of the biceps tendon pain: differential diagnosis and treatment. Journal of orthopaedic & sports physical therapy. Feb. 2009;39(2):55-70.
Lindgren et al. Shoulder pain after stroke: a prospective population-based study. Stroke. Feb. 1, 2007;38(2):343-8.
Loeb et al. The BION devices: injectable interfaces with peripheral nerves and muscles. Neurosurgical focus. May 1, 2006;20(5):1-9.
Loeser JD. The future: will pain be abolished or just pain specialists?. Australasian Musculoskeletal Medicine. May 2001;6(1).
Long DM. Electrical stimulation for relief of pain from chronic nerve injury. Journal of neurosurgery. Dec. 1, 1973;39(6):718-22.
Lynch et al. Continuous passive motion improves shoulder joint integrity following stroke. Clinical rehabilitation. Sep. 2005;19(6):594-9.
Maass et al. "Mobility Aid for Quadriplegics," Carnahan Conference on Electronic Prosthesis, Lexington, KY, Sep. 19-21, 1973; pp. 123-125.
Melzack et al. On the nature of cutaneous sensory mechanisms. Brain. Jun. 1, 1962;85(2):331-56.
Melzack et al. Pain Mechanisms: A New Theory: A gate control system modulates sensory input from the skin before it evokes pain perception and response. Science. Nov. 19, 1965;150(3699):971-9.
Memberg et al. An analysis of the reliability of percutaneous intramuscular electrodes in upper extremity FNS applications. IEEE Transactions on Rehabilitation Engineering. Jun. 1993;1(2):126-32.
Moe et al. Functional electrical stimulation for ambulation in hemiplegia. The Journal-lancet. Jul. 1, 1962,82:285-8.
Mortimer et al. Intramuscular electrical stimulation: tissue damage. Annals of biomedical engineering. May 1980:8(3):235-44.
Nashold et al. Electrical stimulation of peripheral nerves for relief of intractable chronic pain. Medical instrumentation. Sep. 1, 1975;9(5):224-5.
Nashold et al. Long-term pain control by direct peripheral-nerve stimulation. JBJS. Jan. 1, 1982;64(1):1-0.
Nashold et al. Peripheral nerve stimulation for pain relief using a multicontact electrode system. Journal of Neurosurgery. Dec. 1, 1979;51(6):872-3.
North RB. Spinal cord and peripheral nerve stimulation: technical aspects. Pain research and clinical management. 2003;15:183-96.
North RB. Spinal cord stimulation for chronic, intractable pain. Pain. 1991;44:119-30.
Paeslack et al. Design and control of a manipulator for tetraplegics. Mechanism and Machine Theory. Jan. 1, 1977;12(5):413-23.
Peckham et al. Alteration in the force and fatigability of skeletal muscle in quadriplegic humans following exercise induced by chronic electrical stimulation. Clinical Orthopaedics and Related Research (1976-2007). Jan. 1, 1976;114:326-34.
Peckham et al. Controlled prehension and release in the C5 quadriplegic elicited by functional electrical stimulation of the paralyzed forearm musculature. Annals of biomedical engineering. Jul. 1980;8(4):369-88.
Peckham et al. Coordinated two mode grasp in the quadriplegic initiated by functional neuromuscular stimulation. IFAC Proceedings Volumes. May 1, 1982;15(2):29-33.
Peckham et al. Multichannel implantable stimulator for control of paralyzed muscle. IEEE Transactions on Biomedical Engineering. Jul. 1981(7):530-6.
Peckham et al. Restoration of key grip and release in the C6 tetraplegic patient through functional electrical stimulation. Proceedings of Intern. Cont on Rehab. Eng., Toranto Canada, 1980, pp. 227-229.
Picaza et al. Pain suppression by peripheral nerve stimulation: chronic effects of implanted devices. Stereotactic and Functional Neurosurgery. May 4, 1977;40(2-4):223-34.
Picaza et al. Pain suppression by peripheral nerve stimulation. Part I. Observations with transcutaneous stimuli. Surgical Neurology. Jul. 1, 1975;4(1):105-14.
Picaza et al. Pain suppression by peripheral nerve stimulation. Part II. Observations with implanted devices. Surgical Neurology. Jul. 1, 1975,4(1):115-26.
Poon et al. An implantable RF-powered dual channel stimulator. Biotelemetry and Patient Monitoring. Jan. 1, 1981;8(3):180-8.
Price DJ. The shoulder block: a new alternative to interscalene brachial plexus blockade for the control of postoperative shoulder pain. Anaesthesia and intensive care. Aug. 2007;35(4):575-81.
Rajaram et al. Shoulder forearm support for the subluxed shoulder. Archives of physical medicine and rehabilitation. Mar. 1, 1985;66(3):191-2.
Ratnasabapathy et al. Shoulder pain in people with a stroke: a population-based study. Clinical rehabilitation. May 2003; 17(3):304-11.

(56) References Cited

OTHER PUBLICATIONS

Rebersek et al. Proportionally controlled functional electrical stimulation of hand. Archives of physical medicine and rehabilitation. Aug. 1, 1973:54(8):378-82.
Renzenbrink et al. Percutaneous neuromuscular electrical stimulation (P-NMES) for treating shoulder pain in chronic hemiplegia. Effects on shoulder pain and quality of life. Clinical rehabilitation. Jun. 2004;18(4):359-65.
Sator-Katzenschlager et al. Subcutaneous target stimulation (STS) in chronic noncancer pain: a nationwide retrospective study. Pain Practice. Jul. 2010;10(4):279-86.
Sharan et al. Evolving patterns of spinal cord stimulation in patients implanted for intractable low back and leg pain. Neuromodulation: Technology at the Neural Interface. Jul. 1, 2002;5(3):167-79.
Sheffler et al. Neuromuscular electrical stimulation in neurorehabilitation. Muscle & Nerve: Official Journal of the American Association of Electrodiagnostic Medicine. May 2007;35(5):562-90.
Snels et al. Effect of triamcinolone acetonide injections on hemiplegic shoulder pain: a randomized clinical trial. Stroke. Oct. 2000:31(10):2396-401.
Snels et al. Treatment of hemiplegic shoulder pain in the Netherlands: results of a national survey. Clinical rehabilitation. Feb. 2000;14(1):20-7.
Spincemaille et al. Technical data and complications of spinal cord stimulation: data from a randomized trial on critical limb ischemia. Stereotactic and functional neurosurgery. Mar. 8, 2001;74(2):63-72.
Teasell et al. An evidence-based review of stroke rehabilitation. Appendix: Management of Post Stroke Pain. Top Stroke Rehabil. 2003 Spring;10(1):29-58.
Thrope et al. A computer-controlled multichannel stimulation system for laboratory use in functional neuromuscular stimulation. IEEE Trans Biomed Eng. Jun. 1985;32(6):363-70.
Turner-Stokes et al. Shoulder pain after stroke: a review of the evidence base to inform the development of an integrated care pathway. Clinical rehabilitation. May 2002;16(3):276-98.
Van Der Windt et al. The efficacy of non-steroidal anti-inflammatory drugs (NSAIDS) for shoulder complaints. A systematic review. Journal of clinical epidemiology. May 1, 1995;48(5):691-704.
Van Ouwenaller et al. Painful shoulder in hemiplegia. Archives of physical medicine and rehabilitation. Jan. 1, 1986;67(1):23-6.
Vodovnik et al. Electronic detours of broken nerve paths. Electronics. Sep. 20, 1965:20:110-6.
Wall J.J. Axillary nerve blocks. American Family Physician. May 1, 1975;11(5):135-42.
Wanklyn et al. Hemiplegic shoulder pain (HSP): natural history and investigation of associated features. Disability and rehabilitation. Jan. 1, 1996;18(10):497-501.
Ware et al. The MOS 36-Item short-form health survey (SF-36): I. Conceptual framework and item selection. Medical care. Jun. 1, 1992;30(6):473-83.
Widar et al. Health-related quality of life in persons with long-term pain after a stroke. Journal of clinical nursing. May 2004;13(4):497-505.
Yu et al. A neuroprosthesis for high tetraplegia. The journal of spinal cord medicine. Jan. 1, 2001;24(2):109-13.
Zorowitz et al. Shoulder pain and subluxation after stroke: correlation or coincidence?. The American Journal of Occupational Therapy. Mar. 1, 1996;50(3):194-201.

* cited by examiner

METHOD AND SYSTEM OF MECHANICAL NERVE STIMULATION FOR PAIN RELIEF

CROSS REFERENCE TO RELATED APPLICATIONS

This application is a continuation of U.S. patent application Ser. No. 18/084,629 filed Dec. 20, 2022 and entitled "METHOD AND SYSTEM OF MECHANICAL NERVE STIMULATION FOR PAIN RELIEF," which is a continuation of U.S. patent application Ser. No. 15/790,564 filed Oct. 23, 2017 and entitled "METHOD AND SYSTEM OF MECHANICAL NERVE STIMULATION FOR PAIN RELIEF," now U.S. Pat. No. 11,540,973, which claims priority to U.S. Provisional Patent Application Ser. No. 62/411,068, filed on Oct. 21, 2016, each of which is incorporated as if fully rewritten herein.

TECHNICAL FIELD

The present invention relates generally to systems and methods of relieving pain. More specifically, a system and method of using a lead introduced to a subject proximate to a region of pain is contemplated to deliver pain relief without the need for multiple needle insertions or electrical stimulation.

BACKGROUND

Various systems have been used for the relief of chronic and acute pain. As one example, external and/or implantable devices may deliver electrical stimulation to activate nerves and/or muscles to provide therapeutic treatments via electrodes placed on or inserted into a patient's body. These "neurostimulators" are able to provide treatment and/or therapy to individual portions of the body. In many cases, surface electrode(s), cuff-style electrode(s), paddle-style electrode(s), or epidural-style or cylindrical-style electrodes and/or leads may be used to deliver electrical stimulation to the select portion of the patient's body. In turn, the stimulators must be connected to a power source in order to deliver therapy. Non-limiting examples of such approaches can be found in U.S. Pat. Nos. 6,845,271; 8,788,048; and 8,954,153, as well as United States Patent Publication Nos. 2012/0290055; 2013/0238066; and 2013/0296966. All of these patents and publications are incorporated by reference.

Alternatively, non-electrical pain relief methods may include magnetic therapy, acupuncture, and acupressure. The efficacy of these methods is the subject of considerable debate. Further, to the extent acupuncture has been disclosed, the method often relies upon insertion of a plurality of needles for temporary pain relief, with longer term relief requiring multiple (and often uncomfortable) sessions in which multiple needle insertions are required. Also, the needles must be inserted and removed by a trained expert, and patients must be highly compliant in following the therapy regimen in order to maximize the benefits of the therapy. Examples of these various systems and methods of this nature are represented by U.S. Pat. Nos. 8,380,298; 6,783,504; 4,662,363; and 4,508,119. Further, a "hybrid" acupuncture technique also relying on electrical stimulation is disclosed, for example, in U.S. Pat. No. 4,262,672.

In view of the shortcomings associated with these prior methods and systems, a system and method that allows for lasting relief of pain, with fewer clinical procedures is needed. In the same manner, a method and system requiring only a single invasive apparatus that can remain indwelling in the body and provide continued or prolonged pain relief without relying on electrical stimulation or multiple or repeated needle insertions.

SUMMARY

Given the above-mentioned processes, and their attendant limitations, the current system allows for pain relief by relying on a single, flexible, long-term wire or lead placed in or proximate to the region of pain.

As such, the systems and methods described herein possesses several benefits, particularly in comparison to the previously known methods identified above:

- Minimally-invasive, non-chemical, long term pain relief is provided relying on a small lead that may be non-surgically implanted via an introducer needle without subsequent (possibly continuous) electrical or magnetic stimulation.
- Percutaneous lead placement can be accomplished in muscle or other body tissue in or around the region of pain (e.g., back, shoulder, upper or lower extremities, etc.).
- The indwelling, three-dimensional, and flexible structure of the lead (e.g., coiled or braided wire) continually activates surrounding tissue and fiber via normal body movement to provide lasting therapy, thereby reducing the number of clinical visits required, while also being resistant to fracture and providing anchoring structure(s) to prevent dislodgement or premature/unwanted withdrawal of the lead.
- Long lasting efficacy and the passive nature of the therapy (i.e., no need for electrical stimulation or further intervention by a skilled clinician or the patient) enable delivery of therapy in a home environment, thereby significantly reducing repeated checkups/clinical visits and the need for patient diligence/compliance.
- Only minimal training is required for clinicians, with the insertion process being quicker (owing to the use of a single lead, a minimal number of needle insertions, and an insertion process that is more forgiving because it allows for a wider range of insertion locations or distances from nerves) and more comfortable for the patient.
- Improved patient outcomes are achieved by allowing patients to be more active, thereby creating a self-reinforcing positive feedback system—energy from movement is transferred into the lead and released into the tissue in a manner that further relieves pain. Also, the lead can be removed when pain is relieved and function improves, thereby avoiding a perception of permanence by the patient.

In one aspect, the invention is a method for delivering pain relief including any combination of the following:

- Percutaneously or otherwise implanting a flexible, open-coiled helical structure in a human via a non-surgical procedure;
- permitting fibrotic ingrowth or encapsulation of the helical structure;
- after fibrotic ingrowth or encapsulation has occurred, mechanically stimulating at least one of Type Ia and Ib target afferent nerve fibers to generate an action potential in the at least one of Type Ia and Ib target afferent nerve fibers while avoiding generation of action potentials in non-target Type III and IV nerve fibers to reduce a perception of pain, wherein the at least one of Type Ia and Ib target afferent nerve fibers are located outside a central nervous system of the human;

wherein the at least one of Type Ia and Ib target afferent nerve fibers are located between a neural receptor and the central nervous system;

wherein the at least one of Type Ia and Ib target afferent nerve fibers innervate neural receptors;

wherein the neural receptors are proprioceptors;

wherein the at least one of Type Ia and Ib target afferent nerve fibers are in neural communication with neural receptors and are activated at a location that is between the neural receptors and a central nervous system;

wherein the neural receptors are proprioceptors;

wherein the non-target nerve fibers include efferent nerve fibers;

wherein the at least one of Type Ia and Ib target afferent nerve fibers are located outside a neural receptor; and wherein the percutaneously implanting includes non-surgically implanting a lead and the method further comprising mechanically stimulate efferent nerve fibers via the lead to contract a muscle and to generate responsive action potentials by the at least one of Type Ia and Ib target afferent nerve fibers.

In another aspect, the invention is a method for reducing a perception of pain by an animal of a hypersensitized portion of the animal nervous system including any combination of the following:

applying mechanical stimulation through a helical, spring-like structure to tissue connected to neural receptors of target Type I afferent nerve fibers to generate an action potential in the target Type I afferent nerve fibers while avoiding delivering mechanical stimulation that would generate action potentials in non-target Type III and Type IV afferent nerve fibers, thereby causing a reduction of perception of pain by the animal;

wherein the animal is a human and the target Type I afferent nerve fibers are located neurologically between and outside a neural receptor and a central nervous system of the human;

wherein the mechanical stimulation is performed for a predetermined treatment time, and wherein the reduction of perception of pain occurs at least partially during the treatment time and after the end of the predetermined treatment time;

wherein the target Type I afferent nerve fibers include either of Type 1a and Type 1b nerve fibers;

wherein the non-target nerve fibers include efferent nerve fibers;

wherein the mechanical stimulation causes stretching of tissues and activation of nerve endings or receptors connected to afferent fibers proximate to the tissues; and wherein the stretching is above the threshold for generation of action potentials in target Type 1 fibers while also being below the threshold for generation of action potentials in non-target Type III and Type IV fibers.

In third aspect, the invention is a method of pain relief including any combination of:

positioning a stimulation device having an open coil, helical structure in human tissue proximate to neural receptors of target Type I afferent nerve fibers and, after a period of time sufficient to allow at least partial fibrotic ingrowth and/or encapsulation of the open coil, helical structure, mechanically manipulating the device so as to generate action potential in the target Type I afferent nerve fibers;

wherein the generation of action potential does not require electrical stimulation and does not generate action potentials in non-target Type III and/or Type IV afferent nerve fibers;

wherein the human tissue is located in a shoulder, a back, or extremities of a human body;

wherein a diameter of the open coil, helical structure is optimized for generation of action potentials;

wherein the mechanical stimulation is delivered continuously without requiring clinical visits;

removing of the device via non-surgical procedures after pain relief if first achieved;

wherein pain relief continues to be realized after removal of the device; and wherein the device comprises a helically-coiled wire lead.

The present teachings relate to a device or system, as well as a method of using and instructing others to use the same, for pain relief. The system includes an open coil, helical structure inserted or implanted percutaneously into tissue having nerve fiber. The insertion point is preferably on a human body, in its shoulder, back, or other extremities (e.g., arm, leg, etc.). The open coils are sufficient to sustain and permit ingrowth of tissue. After such ingrowth, the system's pain relief is realized by mechanically stimulating the device, without the use of any electrical current. The coils may have constant or varying diameter, and the structure may be optimized by adjusting the diameter to deliver pain relief.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the present teachings may be better understood by reference to the detailed description taken in connection with the following illustrations. These appended drawings form part of this specification, and any written information in the drawings should be considered as if fully rewritten in this specification. In the same manner, the relative positioning and relationship of the components as shown in these drawings, as well as their function, shape, dimensions, and appearance, may all further inform certain aspects of the invention as if fully rewritten herein. In the drawings:

FIG. 4B showing fibrotic ingrowth into or around the coils of the coiled lead; and FIG. 4C showing complete fibrotic ingrowth and encapsulation of the coiled.

DETAILED DESCRIPTION

Figure 1C:
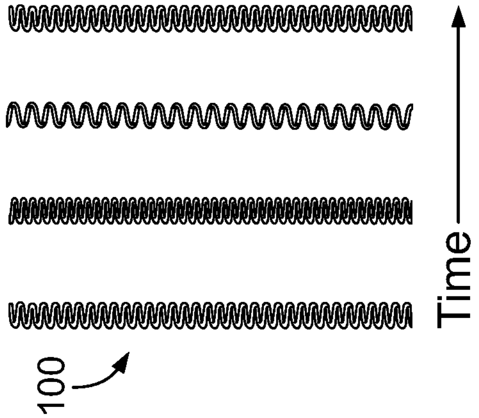
FIG. 1C are exemplary side views of coiled leads as they might expand, contract, and flex within tissue.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The present teachings provide a method, system, and device designed to provide therapeutic relief of pain though mechanical activation of body tissues (e.g., muscle fibers, nerve fibers), as it was not previously known how to produce pain relief with this device without delivering electrical stimulation. The device consists of a wire, or lead, comprised of a three-dimensional structure, which may be deployed in the body in or around a region of pain. Prior to the present invention, it was not known how (or that it was possible) to manufacture, supply, deliver, or place a device that could relieve pain without delivering a chemical or substance or an electrical or magnetic waveform, but instead could translate the energy produced by the movement(s) of the body or parts of the body (e.g., muscle, adipose, connective, or other tissue) into a signal for pain relief. As such, it was not previously known how to manufacture this system without the use of an electrical stimulator in such a way that it could relieve pain. However, the present invention overcomes limitations of previous applications of electrical or mechanical stimulation therapies and provides a mechanism to generate continuous mechanical activation of local tissues for therapeutic relief of pain.

This device described in this invention may be composed of metallic and/or polymeric materials that are suitable for insertion into and indwelling (e.g., biocompatible and safe) in body tissue. The device may be covered, in whole or in part (e.g., including the coiled structure and/or anchor(s)), with insulative material (e.g., polymer or material with a low coefficient of friction), which for example may facilitate easy and comfortable removal (e.g., removal without pain) from the body in a non-surgical procedure. The device design (i.e., the three-dimensional shape) and material composition will overcome drawbacks of existing applications, which are rigid and prone to fracture or migration, enabling flexibility and movement with tissue, preventing fracturing or damage to the lead itself.

Certain embodiments of the device include a wire structure, not limited to, a helical coiled shape or another three-dimensional, non-smooth structure (e.g., twisted or braided). Use of the term "wire" is not intended to limit this disclosure to a particular material (e.g., metal wire), and this disclosure may encompass any number of materials capable of being formed into the shapes and/or used for the purposes disclosed herein. Non-limiting examples of a wire or lead structure are shown in FIG. 1A. Generally speaking, a wire is formed into a spring-like, helical structure. The windings of the wire may be of any chirality, with separate examples of wire leads 100, 200, and 300 shown in FIG. 1A.

Figure 1B:
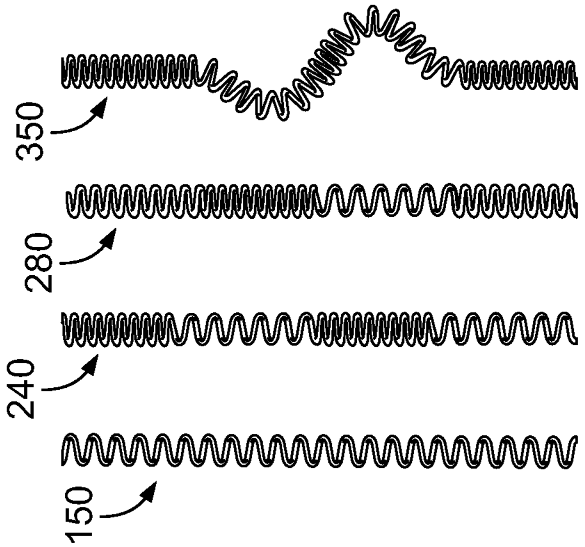
FIG. 1B are exemplary side views of alternative coiled leads according to certain disclosed aspects.
Figure 1A:
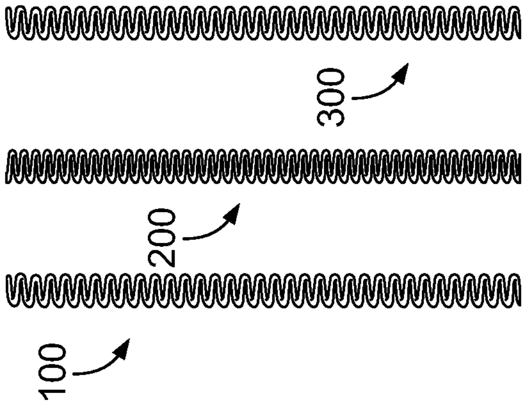
FIG. 1A are exemplary side views of coiled leads according to certain disclosed aspects.

FIG. 1B illustrate alternative arrangements of the coiled lead. In lead 150, a wider spacing (in comparison, e.g., to lead 100 in FIG. 1A) is provided between the individual coils. This spacing may be varied at differing points along the length of leads 240 and 280, or it is possible to regularly or irregularly change the spacing on a coil by coil basis (not shown). Lead 350 is formed with additional bends or twists along the overall length of the lead itself (as opposed to the individual coils) to further facilitate anchoring with the tissue.

While the leads are all shown as either flat or twisting in only two dimensions, it will be understood that any embodiment, including lead 350, could actually twist in all three dimensions in a regular or irregular fashion, possibly even itself taking on a helical or "corkscrew" type shape. Also, for purposes of describing the invention, the drawings in FIGS. 1A and 1B should be considered as being drawn to scale, and the ratios of thickness of wire in comparison to the diameter of the lead and spacing of the coils, as well as the relative spacing/distance between individual coils, twists, and bends, are all considered to be part of this disclosure, although other thicknesses and spacing distances are possible. Also, while a single gauge, smooth wire is shown, it will be understood that the wire forming the coils may itself have variable thickness and/or possess a woven or braided nature comprising multiple strands.

In another aspect, the lead might have two or more segments, including a distal segment for insertion into the body and an optionally proximal segment that protrudes out of the body. The proximal section could have a larger diameter coil, thicker gauge wire, and/or a different texture or shape to allow for easier manipulation of the lead, particularly in the event it must be removed. A cone or transition element delineates where the distal end begins. As noted above, one or more anchors can be provided in the distal section to better secure it within the tissue.

One aspect of particular note is the coiled or helical shape of the lead. These coils may possess a certain amount of spring-like action, thereby providing flexibility for the lead in all directions (i.e., both laterally and axially). FIG. 1C indicates how the coils of lead 100 may contract and expand in an exemplary axial direction over time and then return to its original shape. In this regard, selection of a material possessing sufficient structural and/or spring action would further facilitate this aspect. In the same manner, lateral, bending, or twisting forces would allow for further temporary changes to the shape of the lead, with it ultimately returning to its original form (e.g., a straight line, corkscrew, etc.).

As noted throughout, other structures for the wire structure are possible—including multiple strands of wire that are regularly or irregularly twisted, braided, or woven together. When provided, these braided wires impart similar flexibility. It is also possible to form a braided wire into the helical structure depicted in FIG. 1, thereby imparting even more strength and flexibility to the structure.

In any embodiment, the lead may be composed of both three-dimensional, non-smooth sections and smooth or straight sections. Further, the coiled, or other three-dimensional structure, enables activation of a larger, expanded volume of the tissue than is possible with application of a straight or smooth fine wire. Thus, the continuous activation of surrounding tissues with this device is more impactful with the three-dimensional, coiled wire that enables mechanical activation of a larger volume of tissue.

The device may include additional components along its length (e.g., composed of three-dimensional shaped wire) to provide attachment within body tissue for the duration of its therapeutic use. In one embodiment, the device may include a securing structure (e.g., an anchor, barb, or hook) that provides addition attachment to the surrounding tissues, preventing dislodgement or premature withdrawal at any point along the length of the lead. The anchoring portion of the lead may be composed of a single or multiple anchors (e.g., that are continuous with the metallic wire(s) composing the coiled lead structure). Further, the three-dimensional (e.g., coiled) shape of the wire or lead may allow for tissue ingrowth to provide additional security within the body, preventing migration or dislodgement.

In certain aspects, the proximal end of the lead is designed to protrude only slightly from the patient's skin. This section may be used to remove the lead when the therapy has concluded. The proximal section may, therefore possess a larger diameter or otherwise include features that make it easier to grip and pull on the lead. In some embodiments, this protruding section may be covered with a bandage.

The device is designed to be introduced into the body using a minimally invasive approach, for example by needle insertion and deployment, but may also be placed surgically. In one embodiment, this minimally-invasive implant may be inserted using a small, thin needle for insertion and deployment of the wire upon retraction of the needle, thus avoiding the need for surgical placement. As such, this lead insertion technique enables placement in muscle or other body tissues in or around a region of pain, and the device, for example, could be placed in the back, shoulder, extremity or other area of pain. An introducer system that may be adapted for insertion is disclosed in International Patent Application No. PCT/US2016/57267, filed on Oct. 17, 2016 and incorporated by reference herein.

The device may enable pain-relieving effects by producing mechanical stimulation of local tissue both at the distal portion of the structure or anywhere along the length of the lead, enabling an optimized placement of the device within the tissue. Further, this device is self-optimizing, as it may continue to produce activation depending on local tissue or gross body movement for the duration of the therapy. This self-optimizing device and the resulting therapy overcome difficulties in procedures (e.g., precision, skill, and time required of the clinician or technician) required for mechanical stimulation therapies (e.g., dry needling, acupuncture) as well as the challenges associated with implantation of electrical stimulation therapies (e.g., skill needed for precise placement of electrodes, time involved in procedure, therapy time requiring active involvement by patient and clinician, dependence on distance from nerve). For example, the present device may have a larger diameter than the needle utilized in acupuncture. This would generally prevent the present device from being utilized in acupuncture as the pain relief recognized immediately from insertion of the present device would not overcome the transient pain from the insertion of the present device. This does not apply to acupuncture where the pain from insertion of the needle is outweighed by any potential corresponding pain relief. The present device, however, is designed to remain in the patient for a long term, e.g., for weeks, months, years or even permanently. Therefore, the present device may enable continuous relief of pain following a simple procedure due to the absence of active therapeutic involvement from clinicians, technicians, or the patient, that is the indwelling lead structure enables the patient to experience mechanical activation of local tissues, which may produce pain relief, without actively participating in the therapy (e.g., undergoing frequent procedures or operating a device). Although the indwelling device appears to exert passive effects, the device effectively transfers energy from normal body movements to the local tissues, due to the three-dimensional, coiled shape (e.g., which activates a larger volume of local tissue), to generate mechanical activation of local tissues, which may produce local or systemic stimulatory effects for pain relief.

Further still, the present system, because it does not utilize any electrical stimulation, it does not need to be connected to an electrical stimulation generator or device. Avoiding this connection also avoids the opportunity that the connection between the present device and the electrical stimulation will come undone during application of the therapy. This may, therefore, be a benefit of the present system. It may be used regardless of how active the patient is and may allow a patient to remain active. It essentially may allow a patient to perform all activities without restriction.

The present system may remain implanted in a patient for a predetermined amount of time. Such time may comprise, days (2 to 7 for example), weeks (2 to 51 for example), years or even permanently. The present system may need to be in place for a few days (2 or more) before a patient begins to recognize any pain relief. The movement of the patient with the present system implanted may provide the mechanical stimulation to result in the pain relief in the patient—in fact the more movement the more pain relief that may be recognized in some patients. This is different from other forms of treatment such as acupuncture, which may result in pain relief upon insertion of a small needle. The lead of the present system is likely too large to achieve pain relief upon insertion—it would not overcome the transient pain from insertion of the lead. For example, the present lead may have a diameter that is of the same size as a 19 or 20 gauge needle, whereas an acupuncture needle may only be 30 gauge (the smaller the gauge the larger the diameter).

Further, the present system may allow less technically experienced practitioners to effectively practice to reduce pain in patients. As opposed to systems that utilize electrical stimulation the placement of the lead can be deployed over a greater area while successfully achieving pain relief. This may allow a non-specialist (such as a family doctor, nurse practitioner, physician's assistant or the like) to successfully deploy.

The nervous system of an animal generally comprises efferent and afferent neural fibers, and prior pain reduction modalities using electrical or magnetic stimulation have focused on action potential generation or activation in non-nociceptive afferent neural fibers to inhibit, or "close the gate" on, the transmission of nociceptive pain signals to the brain. This mechanism is commonly referred to as the "gate control mechanism". With reference also to FIGS. 2-6, the system, method, device, and instructions for use of systems, methods, or devices of the present invention may mediate pain relief by mechanically activating somatosensory pathways that may be associated with mechanoreceptors, thermoreceptors, proprioceptors, and/or chemoreceptors, by the non-surgical implantation via an introducer needle of a small lead without subsequent electrical or magnetic stimulation. Generally, types of neural cells, axons, nerve fibers, or physiological structures that may be affected by the implantation of a small lead include functional afferent types A and C axons and efferent type A axons.

Figure 2:
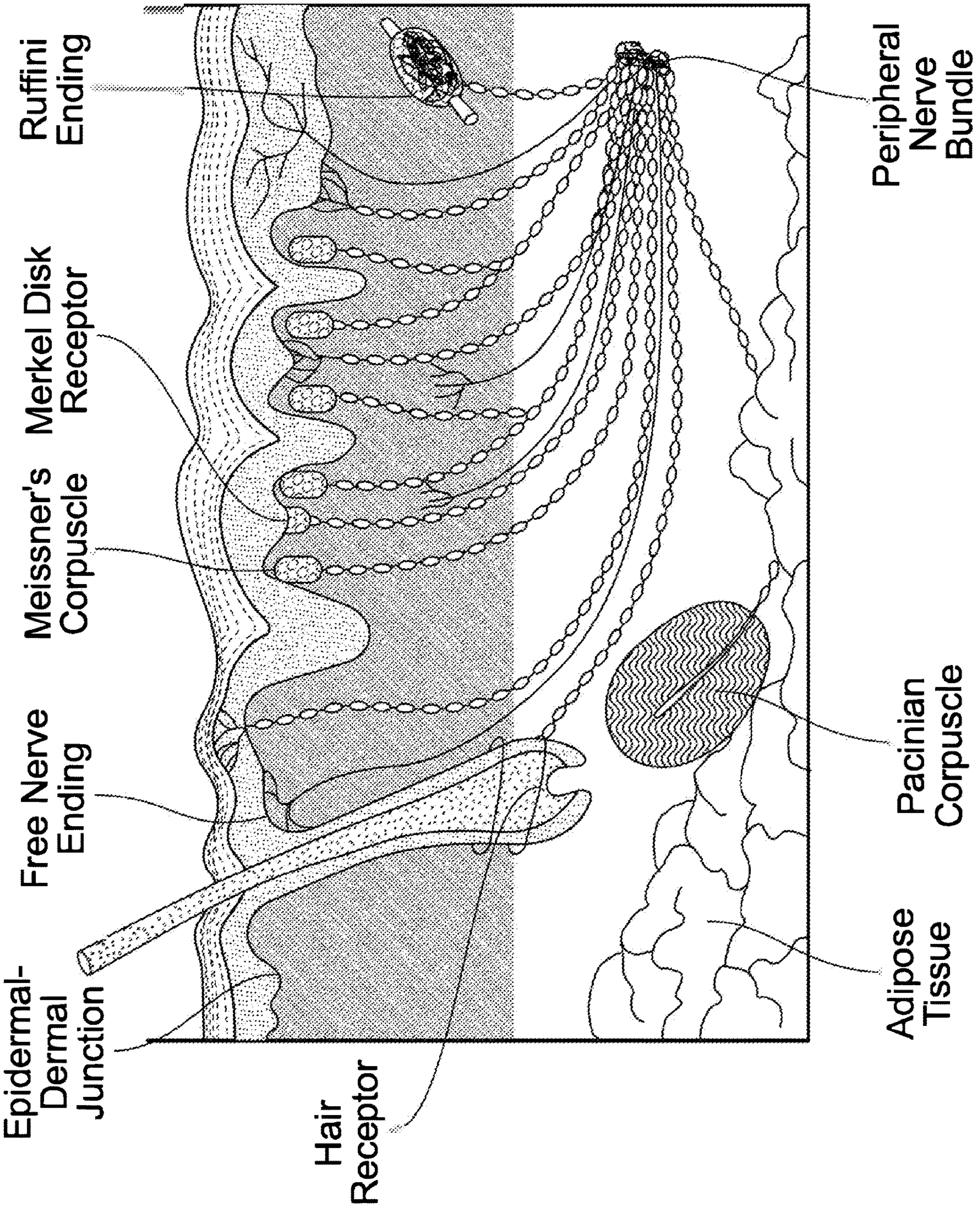
FIG. 2 shows the types of receptors and nerve endings that may exist in the dermis, subdermis, and other tissue layers deep to the skin.

The afferent axons may be classified as Aα (Type Ia or Ib), Aβ (Type II), Aδ (Type III), or C (Type IV). Aα (Type Ia) fibers are generally recognized as being associated with the primary sensory receptors of the muscle spindle, such as for transducing muscle length and speed. These fibers are myelinated, usually having a diameter from about 9 to about 22 micrometers (μm), although other diameters have been observed and may be included, and a conduction velocity of about 50 to about 120 meters per second (m/s), which is known to be proportional to the diameter of the fiber for both this type and other types of myelinated fibers. Aα (Type Ib) fibers are generally recognized as being associated with Golgi tendon organs, such as for transducing muscle contraction. These fibers are myelinated, having a diameter from about 9 to about 22 micrometers (μm) and a conduction velocity of about 50 to about 120 meters per second (m/s). Aβ (Type II) fibers are generally recognized as being associated with the secondary sensory receptors of the muscle spindle, such as for transducing muscle stretch. These fibers are also associated with joint capsule mechanoreceptors (as transduces joint angle) and all cutaneous mechanoreceptors (FIG. 2). The cutaneous mechanoreceptors may include Meissner's corpuscles, Merkel's discs, Pacinian corpuscles, Ruffini corpuscles, hair-tylotrich (for sensing stroking/fluttering on the skin or hair), and the field receptor (for sensing skin stretch).

Meissner's corpuscles are nerve endings that can be found in the skin, which transmit afferent information regarding touch (such as soft, or light, touch) and/or vibration, especially at vibration frequencies of less than 50 Hz. These fibers are rapidly adapting receptors that are often located below the epidermis within the dermal papillae. The corpuscles may be found as encapsulated unmyelinated nerve endings, comprising flattened supportive cells arranged as horizontal lamellae surrounded by a connective tissue capsule. Examples of this corpuscle have been described as having a length of about 30 to about 140 μm and a diameter of about 40 to about 60 μm.

Merkel's discs are a type of mechanoreceptor found in the skin, hair follicles, and in the oral and anal mucosa. The discs transmit afferent information regarding pressure and texture. Sometimes referred to as a Merkel disc receptor or Merkel cell-neurite complex, the nerve ending comprises a Merkel cell next to a nerve terminal. A single afferent nerve fiber may innervate multiple nerve endings, such as 50-100 endings. This mechanoreceptor is an unencapsulated, slowly adapting type I mechanoreceptor that will provide a non- or minimally-decaying response to pressure. The Merkel disc receptor may have two phases of firing, dynamic and static. In the static phase, an irregular activity may be observed, which may be typical of slowly adapting type I mechanoreceptors but contrasts with the regular pattern of slowly adapting type II mechanoreceptors.

Pacinian corpuscles are nerve endings that may be found in the skin. They may also be found in the mesentery, between layers of muscle, and on interosseous membranes between bones. Pacinian corpuscles transmit afferent information regarding pain and pressure. For instance, these corpuscles may detect gross pressure changes and vibrations and may fire in response to quick changes in joint position. They are phasic tactile mechanoreceptors that can detect deep pressure because they are found below the skin surface, usually in the dermis, and comprise some free nerve endings.

Ruffini corpuscles are slowly adapting mechanoreceptors that may be present in the glabrous dermis (hairless skin) and subcutaneous tissue of humans. These corpuscles transmit afferent information regarding skin stretch, movement, position (such as position of the fingers), and sense of control (such as slipping of objects along the skin surface). This type of receptor may have a spindle shape, and they may be found in the deep layers of the skin, allowing them to indicate continuous pressure states and mechanical joint deformation, such as joint angle change.

The Aβ fibers are myelinated, usually having a diameter from about 6 to about 12 micrometers (μm), although other diameters have been observed and may be included, and a conduction velocity of about 33 to about 75 meters per second (m/s).

Aδ (type III) fibers are generally recognized as being associated with free nerve endings of touch and pressure (for sensing excess stretch or force), hair-down receptors (for sensing soft, or light, stroking), nociceptors of the neospinothalamic tract, and cold thermoreceptors. These fibers are thinly myelinated, having a diameter from about 1 to about 5 micrometers (μm) and a conduction velocity of about 3 to about 30 meters per second (m/s).

C (type IV) fibers are generally recognized as being associated with nociceptors of the paleospinothalamic tract, and warmth thermoreceptors. These fibers are unmyelinated, having a diameter from about 0.2 to about 1.5 micrometers (μm) and a conduction velocity of about 0.5 to about 2.0 meters per second (m/s).

As mentioned above, most nerve bundles include both afferent and efferent fibers. The efferent axons may be classified as Aα or Aγ. Aα efferent fibers are generally recognized as being associated with extrafusal muscle fibers. These fibers are myelinated, having a diameter from about 13 to about 20 micrometers (μm) and a conduction velocity of about 50 to about 120 meters per second (m/s). Aγ efferent fibers are generally recognized as being associated with intrafusal muscle fibers. These fibers are myelinated, having a diameter from about 5 to about 8 micrometers (μm) and a conduction velocity of about 20 to about 40 meters per second (m/s).

Figure 3:
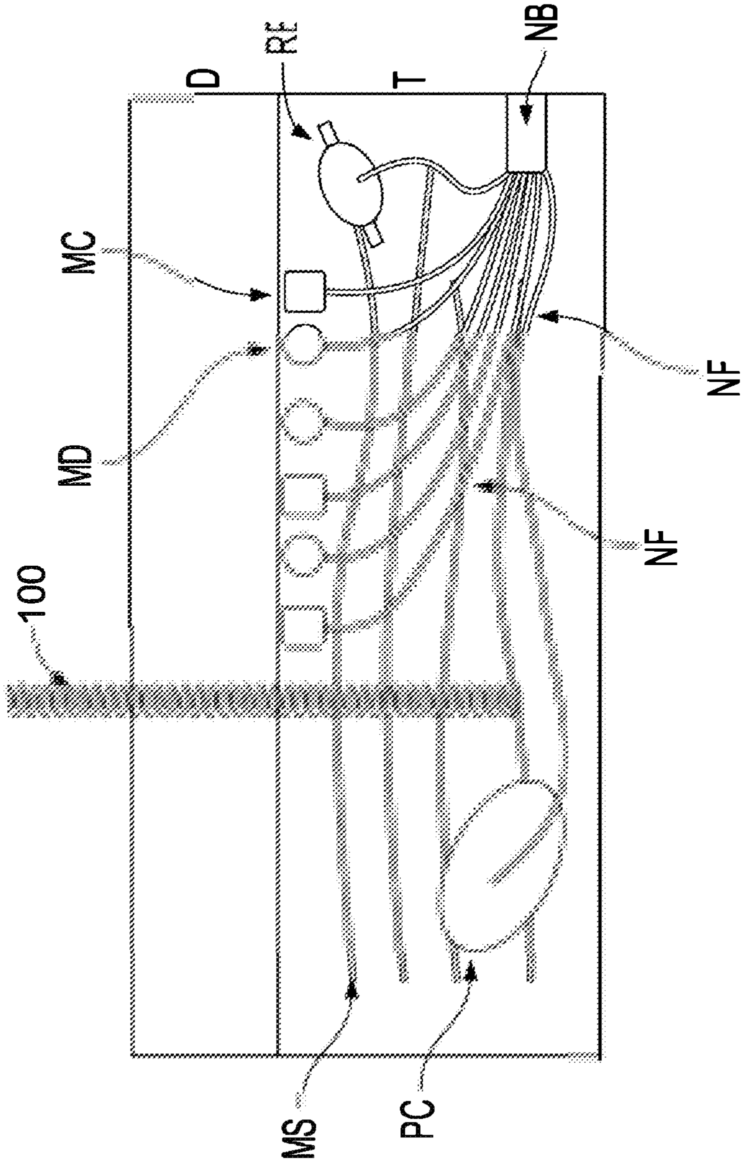
FIG. 3 is an exemplary side view illustrating the percutaneous placement of a coiled lead or structure into body tissue in the vicinity of various types of nerve endings and receptors.
Figure 5A:
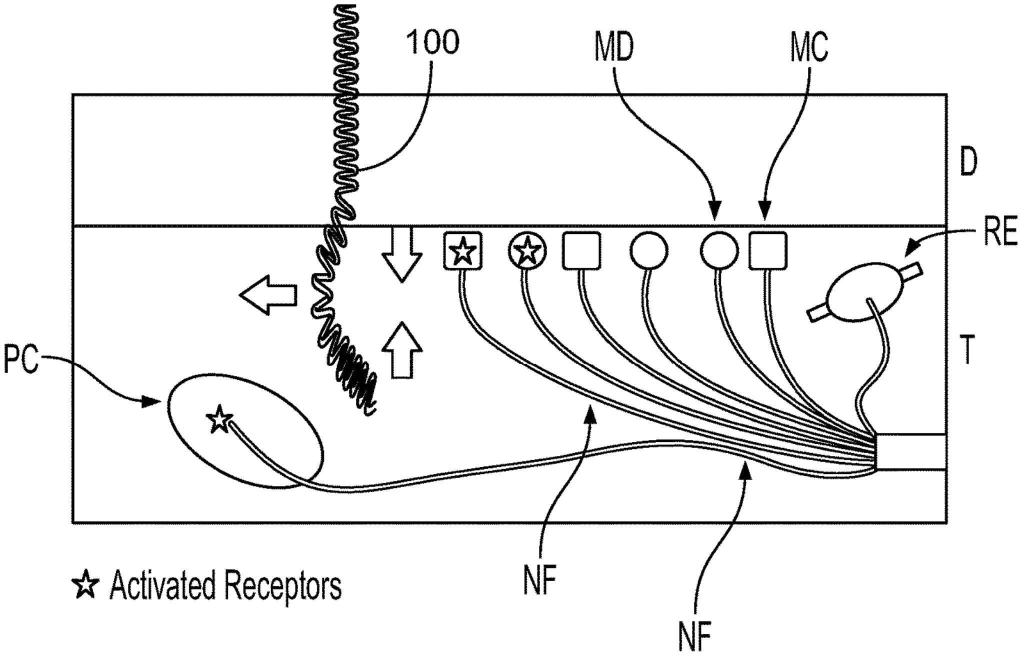
FIGS. 5A and 5B are comparable to the view shown in FIG. 3, demonstrating how bending, stretching, or compression of the lead or coiled structure causes stretching or compression of tissue in which nerve endings and receptors are present, leading to activation of the nerve endings and/or receptors that is transmitted to the CNS and relieves pain.
Figure 5B:
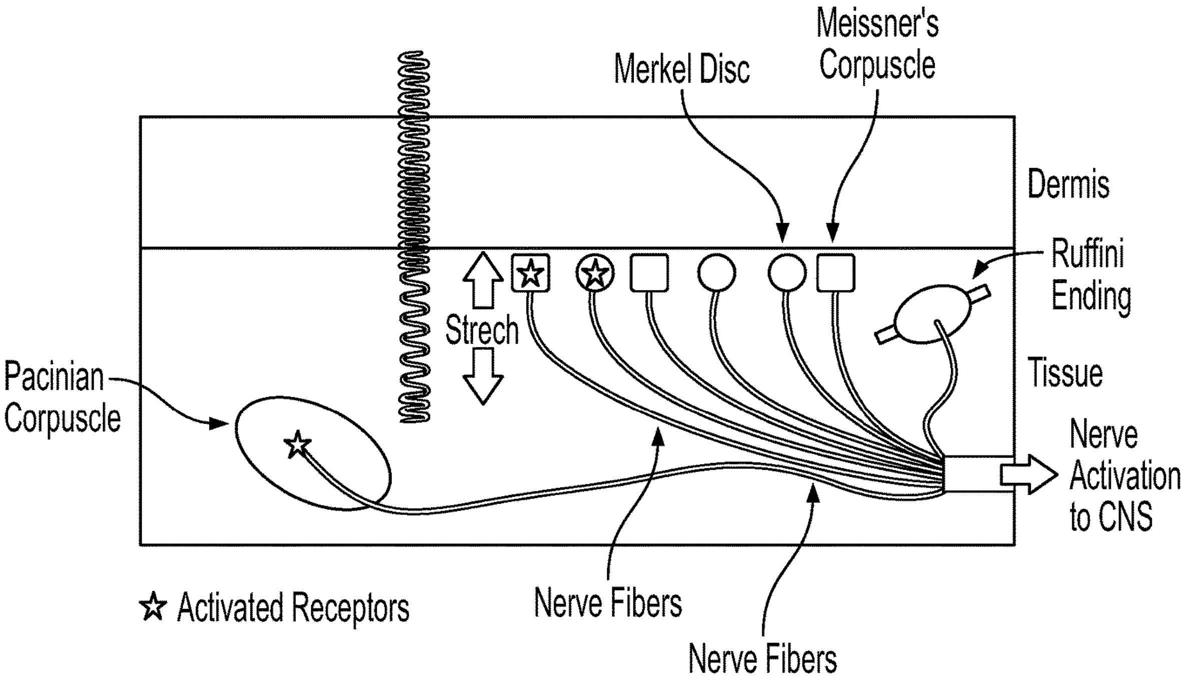

A first method according to the present invention includes activation or instructions for activation of afferent fibers (e.g. Type Ia, Ib, and/or II, which may also be called Aα and/or Aβ afferent fibers) by one or more non-surgically implanted devices, structures, or leads (FIG. 3), such as a helically-coiled lead, via an introducer needle without subsequent electrical or magnetic stimulation, which afferent fibers are physically located in an area from or in which a subject is perceiving pain. When a fiber is referred to herein as "activated," it is to be understood that at least one action potential is generated or initiated by or along, or propagated along, such fiber. Such afferent fiber activation may mediate pain relief by activation of afferent pathways associated with primary receptors of muscle spindles, Golgi tendon organs, secondary receptors of muscle spindles, joint receptors, touch receptors (e.g. Meissner's corpuscles, Merkel disk receptors, Pacinian corpuscles, Ruffini endings, etc.) other types of mechanoreceptors (e.g. joint capsule mechanoreceptors), and/or proprioceptors (FIGS. 3, 5, and 6). As a non-limiting example, the lead may activate one or more Aβ fibers that carry afferent information from a mechanoreceptor (i.e. a sensory receptor) that responds to mechanical pressure or distortion. The lead may be placed in muscle or in non-muscle tissue (e.g. subcutaneous, connective, adipose or other tissue). Non-limiting examples of mechanoreptor pathways that may be activated by the lead include (1) one or more Pacinian corpuscles; (2) one or more Meissner's corpuscles; (3) one or more Merkel disc receptors; and/or (4) one or more Ruffini corpuscles (FIG. 5). The lead may mediate pain relief through the activation of nerve fibers associated with, and/or innervating, receptors that are rapidly adapting, intermediate adapting, and/or slowly adapting.

Another method according to the present teachings comprises activation or instructions for activation of one or more afferent nerve fibers that may be located outside an area from or in which an animal is perceiving pain, and may or may not be associated with the mentioned receptors. Such activation may be beneficial to patients experiencing pain in regions no longer innervated or that were not previously innervated by the activated fibers, such as those patients that may have had removal of, or damage to, their afferent receptors. Examples of such situations may be amputee phantom limb pain or tissue damage due to trauma, such as burns, or surgery. Other indications in which such a method may provide beneficial perceived reduction in pain are pathological or disease states (e.g. induced by chemotherapy, vascular insufficiency, cancer, or diabetes) or other considerations that may prevent activation of receptors by physiological transduction. Additionally or alternatively, tissue damage or disease progression may dictate or influence the placement of needles and/or leads; for instance, if a patient suffers from complex regional pain syndrome, it may be desirable to prevent insertion of a needle in the affected area, as it may make symptoms of the syndrome worse, but a needle may be inserted outside of the affected area with less risk.

Alternatively or additionally, to relieve pain in a target muscle, the implanted structure(s), device(s), or lead(s) may be placed in the muscle (e.g. deltoid) that is experiencing the pain near, or within a therapeutically effective distance from, the point where a motor nerve enters the muscle (i.e., the motor point).

Furthermore, the systems, devices, methods, and instructions for use of systems, devices, or methods make possible the treatment of chronic or acute pain in which muscle contraction cannot or should not be evoked (e.g. in the case of amputation pain in which the target area has been amputated is no longer physically present) or is otherwise undesirable, or other cases of nerve damage either due to a degenerative diseases or condition such as diabetes of impaired vascular function (in which the nerves are degenerating, and may be progressing from the periphery), or due to trauma. The systems and methods make possible the placement of one or more structures, devices, or leads in regions distant from the motor point or region of pain, e.g., where easier access or more reliable access or a clinician-preferred access be accomplished; or in situations where the motor nerve point is not available, damaged, traumatized, or otherwise not desirable; or in situations where it is desirable to implant more than one motor point with a single lead; or to avoid tunneling over a large area or over or across a joint, where the latter may contribute to lead failure.

Another method according to the present teachings comprises the activation or instructions for activation of one or more motor (efferent) axons (Aα or Aγ) by one or more non-surgically implanted structures, devices, or leads, such as a helically-coiled lead, via an introducer needle without subsequent electrical or magnetic stimulation, which can, in turn, mediate pain relief by activating extrafusal muscle fibers and/or intrafusal muscle fibers. Activation of extrafusal muscle fibers (e.g. via activation of motor (Aa) axons) can generate and/or modulate responsive afferent activity by contracting muscle fibers, producing tension, and/or causing skeletal movement. The action (e.g. contraction, tension, movement, etc.) produced by efferent activity may be transduced by sensory endings or fibers and transmitted via afferent fibers to the central nervous system, which can mediate pain relief. Activation of intrafusal muscle fibers (e.g. via activation of motor (Aγ) axons) can modulate and/or generate afferent activity by changing afferent firing rate or pattern (e.g. the relative base or steady-state firing frequency, average thereof, and/or the transient firing frequency such that the running average may or may not vary over time according to a pattern or non-patterned sequence) and/or the afferent's sensitivity to mechanical or other stimuli such as stretch, vibration, muscle contraction, etc.

One method of providing pain relief is to activate neurons (or neural structures) innervating (or considered part of)

proprioceptors, modifying proprioception. In either case, of activation of intrafusal (via Aγ efferent axons) and/or extrafusal (via Aα efferent axons) muscle fibers, the neural receptors (associated with or innervated by afferent axons) are allowed to naturally perceive and transduce the effects of such muscle fiber activation. Accordingly, methods according to the present embodiment of a method according to the present teachings may be said to enhance a reduction in pain perception through muscle contraction, which may or may not be perceptible to the naked eye. The muscle contraction, in turn, may cause natural afferent neural activity in response, thereby mediating pain relief.

Existing therapies of dry needling or acupuncture can produce clinically meaningful reductions in various types of pain. However, these therapies require frequent treatment sessions and multiple needle insertions to produce these beneficial effects on pain, and due to the need for patients to return frequently, these therapies often fail to yield long-lasting pain relief.

It is generally recognized that chronic pain in mammals is caused by a sensitization of afferent sensory receptors, including free nerve endings, to noxious or conventional or previously non-noxious stimuli. Sensitization is the process whereby previously non-noxious stimuli are perceived as painful, and this is an integral part of the development and maintenance of chronic pain (as opposed to the acute, healthy pain response). Such sensitization may result from non-nociceptive primary afferents (e.g. AP) afferents sprouting to make additional connections in the spinal cord, from the loss of inhibition in the spinal cord, and/or from central (brain) plasticity resulting from changes in functional connectivity. However, what has been demonstrated by afferent and/or efferent fiber stimulation for the treatment of pain is that such stimulation may actually permanently, or at least long-term, reverse the sensitization process that formed the basis for the chronic pain being treated. Dis-sensitization resulting from afferent and/or efferent fiber stimulation may reverse these changes through alterations in the peripheral and/or central nervous systems, including but not limited to changes in the sensitivity of peripheral sensory receptors, changes in synaptic connectivity, changes in synaptic strength, and changes in the rate and pattern of neural activity. In response to therapy according to the present invention, mechanical stimulation from the placement of a structure, device, or lead may change the firing pattern and rate of peripheral nervous system (PNS) (e.g. afferent) fibers, the firing pattern and rate of central nervous system (CNS) fibers may change, and/or there may be changes in both the PNS & CNS. Additionally or alternatively, there may be changes in the threshold required to active the fibers (in the PNS, CNS, &/or both PNS & CNS). Accordingly, the effects of the afferent and/or efferent activation by mechanical stimulation from an implanted structure, device, or lead within or outside the muscle may outlast the treatment duration, and such effects may exponentially outlast the treatment duration.

In comparison to previous implementations of mechanical stimulation, this invention is a significant improvement because the proposed system enables lasting relief of pain, while requiring fewer visits to clinic for procedures and fewer needle insertions, due to the continuous mechanical stimulation produced by an indwelling, percutaneously placed lead. By avoiding the need for multiple visits and numerous needle insertions (common with the present therapies of dry needling and acupuncture), this invention enables a more comfortable or tolerable placement procedure to deliver the therapy. Traditional applications of mechanical stimulation (e.g., dry needling, acupuncture) require individuals to return to the office or clinic for frequent therapy sessions. These sessions of needle insertions and mechanical tissue activation transfer energy into the system through the pushing and pulling of the needles and tissues. However to prolong the beneficial effects of stimulation, patients must revisit the clinic frequently because they cannot receive treatment at home.

Certain disclosed aspects overcome this limitation by providing a method and device to enable continuous activation of tissues in an innovative, self-repeating way, due to the use of an indwelling lead while the patient is active. The indwelling structure of the lead may continually activate surrounding local tissue, providing therapy that lasts for the duration of implanted use, providing benefits long after initial placement (e.g., allowing therapy to be delivered continuously), which reduces need for additional procedures and needle insertions or visits to clinic associated with current therapies. The three-dimensional lead structure, for example, an open coiled or braided wire, may produce continuous activation of local tissue (e.g., muscle or nerve fibers) to provide pain relief. Thus, this invention removes the need for repeated patient visits to receive therapy, for example, since the device continues to deliver therapy in the home environment after the device has been placed in the body.

Although the mechanisms for acupuncture and dry needling have not been fully established, these methods may produce local effects, e.g., intramuscular stimulation or nerve stimulation, or systemic effects, e.g., autonomic system regulation. With this device, the indwelling wire or lead composed of three-dimensional structure to activate local tissue provides continuous activation of these local and systemic effects, prolonged for the duration of use, which is an advantage over intermittent benefits of therapy received by patients undergoing repeat visits for dry needling procedures (i.e., the benefit from dry needling occurs less often at visits and must be repeated to prolong effects). Further, in addition to continued mechanical activation of tissue with this device, natural or normal body movements undertaken by the individual may increase the benefit received from the indwelling lead. Therefore, the indwelling lead may produce sustained pain relief compared to discontinuous, intermittent therapies requiring multiple clinic visits, which enables the individual to be more active and increase body movements and function, producing continued activation of pain-relieving effects of local mechanical stimulation, improving patient outcomes. With previous mechanical stimulation therapies that require repeated visits to clinic, it is not possible to achieve pain continuous activation of tissue between visits. Therefore, the present invention of placing a lead to activate local body tissues that takes advantage of the natural activities of the individual to translate that into pain relief is not possible in previous applications of mechanical stimulation. Certain embodiments of the device may include a wire or lead with a coiled, spring-like shape that while indwelling in the tissue is designed to move with the tissue, for example enabling the transfer of energy to the device for the activation of local tissue. There is added potential with this device that further improvements in patient outcomes will be achieved because this therapy allows patients to become more active, enabling a self-reinforcing positive feedback system of pain relief that increases activity levels.

Figure 4C:
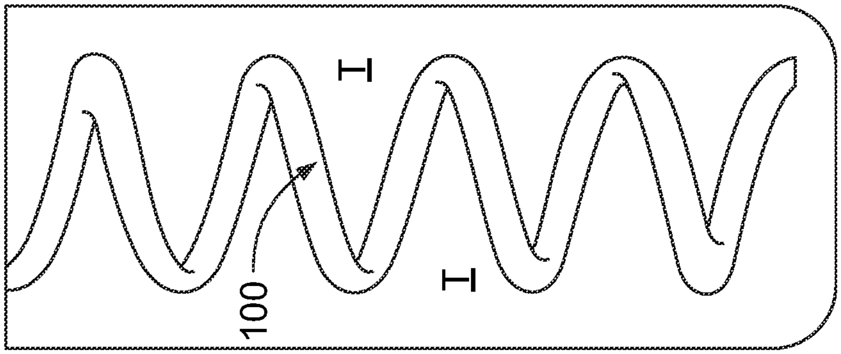
FIGS. 4A-4C are exemplary side views of the relationship between the coiled lead and surrounding body tissue T, with FIG. 4A showing early tissue growth (with exemplary tissue in gray)/ingrowth begins (i.e., early fibrotic encapsulation)
Figure 4B:
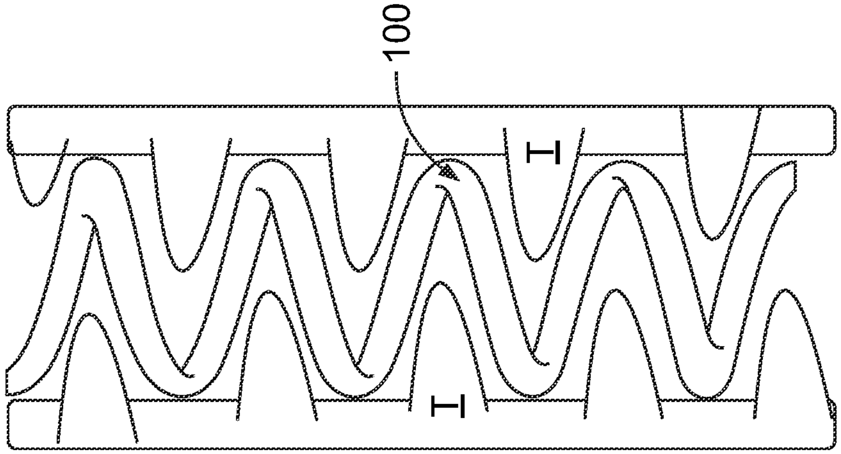
Figure 4A:
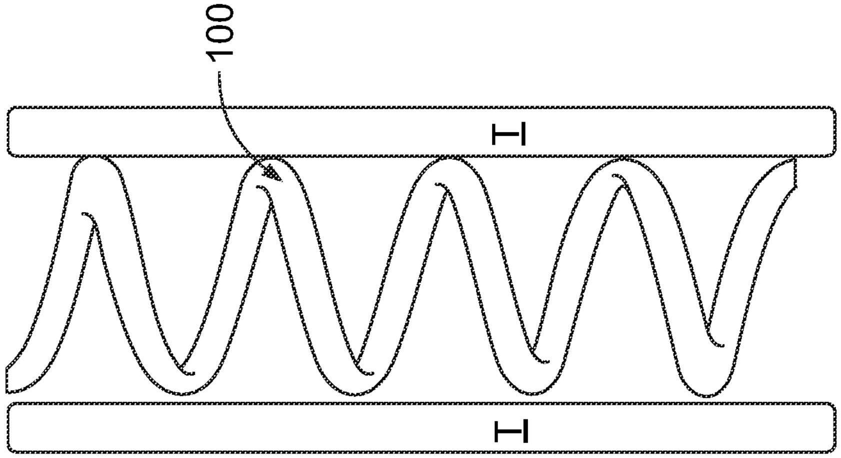

The coiled or three-dimensional structure or shape may also permit, promote, facilitate, and/or encourage the ingrowth of tissue into the wire(s) or lead(s), preventing premature or unwanted dislodgement of the device and allowing the individual to experience pain relief while undergoing their normal activities of daily living, as shown in the time lapsed views of FIGS. 4A through 4C. The properties of the coiled structure(s), wire(s), and/or lead(s) are designed to match the tissue sufficiently close enough to ensure that the device does not fracture or break while indwelling in the tissue It is also to be appreciated that the properties of the coiled structure(s), wire(s), or lead(s) can also be designed (i.e., intentionally) to produce the appropriate mismatch with the properties of the tissue to ensure that the device produces a response in the tissue that produces pain relief. As a non-limiting example, a coiled lead may be sufficiently stiff to exert forces on the surrounding tissue during bending, compression, or stretching of the lead or one or more coils of the lead, but not too stiff such that the coiled lead may damage the tissue in which it is placed by resisting bending, compression, or stretching in response to external forces (e.g., such as forces that may occur due to voluntary muscle contraction, or bending of a joint). The desired parameters that match the tissue sufficiently closely to ensure that the device does not fracture or break while indwelling in the tissue may encompass some range or window of parameters, which may be considered a therapeutic window for the desirable effects (e.g., pain relief, reduction of pain, reduction of pain interference, reduction of disability, and/or improvement in function) of the invention.

The mechanical properties of the structure, device, or lead, such as a coiled lead, can be conferred by the structure and/or construction of the lead. As a non-limiting example, the structure may be comprised of one or more metal wires. Multiple wires may be placed, formed, located, or shaped into a strand of wires to provide specific desirable mechanical characteristics, some or all of which may be intentionally similar and/or dissimilar to characteristics of animal or human tissue in which the structure is designed to be placed. The intentional matching or mismatching of mechanical properties and/or characteristics of the structure relative to the properties and/or characteristics of the animal or human tissue (e.g., muscle and/or muscle tissue, adipose and/or adipose tissue, nerve and/or nervous tissue, connective tissue, skin and/or skin tissue, etc.) causes, enables, produces, elicits, evokes, facilitates, promotes or can cause, enable, produce, elicit, evoke, facilitate, or promote a desirable response and/or set of responses in the body of the animal or human or in the animal or human tissue (e.g., muscle and/or muscle tissue, adipose and/or adipose tissue, nerve and/or nervous tissue, connective tissue, skin and/or skin tissue, etc.), such as the relief of pain, reduction of pain, reduction of disability, reduction of the interference of pain, and/or improvement in function.

The device is designed to be easily removed, as the three-dimensional structure originally deployed may straighten or smooth out to facilitate simple retraction from the body. Coating(s) may be applied to the device, and the coating(s) may be non-stick or minimal stick to control the appropriate type of tissue growth or ingrowth to enable the desired function of the device and/or enable atraumatic and/or non-surgical removal with minimal trauma or tissue disruption. As a non-limiting example, the structure, device, or lead may have a Teflon or Teflon-like coating such that the device may be removed easily by a clinician and/or a patient with minimal or no concern for tissue disruption, damage, discomfort, and/or pain. As another non-limiting example, the structure, device, or lead may have one or more layers of silicon or silicon-like coating such that the device may be removed easily by a clinician and/or a patient with minimal or no concern for tissue disruption, damage, discomfort, and/or pain. As a third non-limiting example, the structure, device, or lead may have one or more layers of a coating designed to improve biocompatibility and/or permit, promote, facilitate, and/or encourage the growth or ingrowth of tissue into, on, around, or among the coils of a lead.

Figure 11:
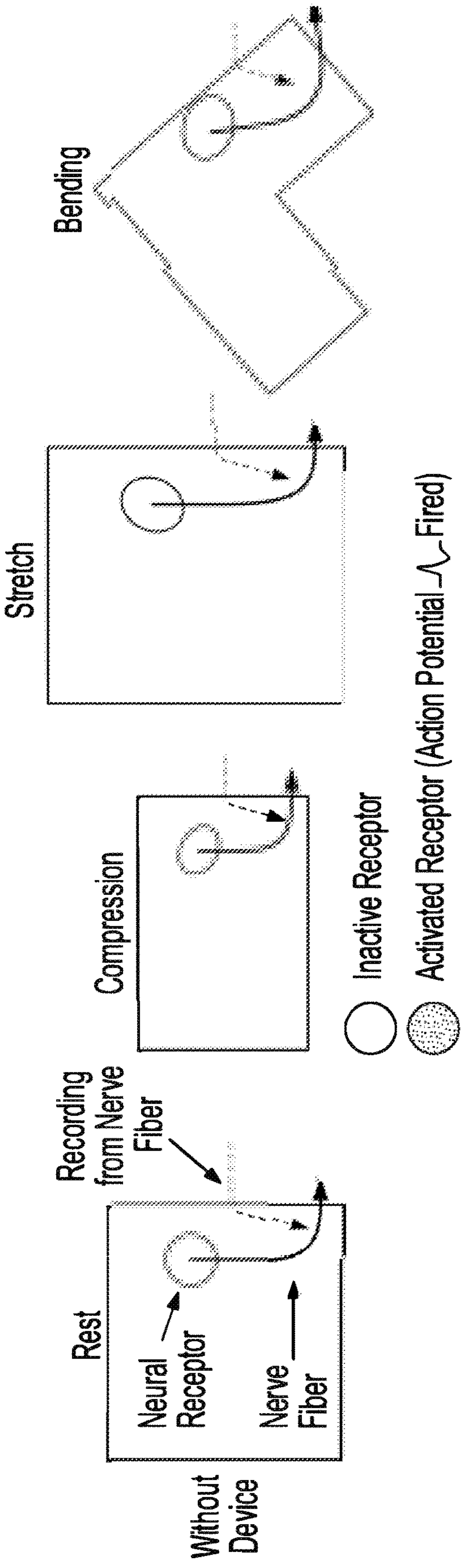
FIG. 11 depicts representative examples of energy from movement without a lead being operatively positioned in the patient.
Figure 12:
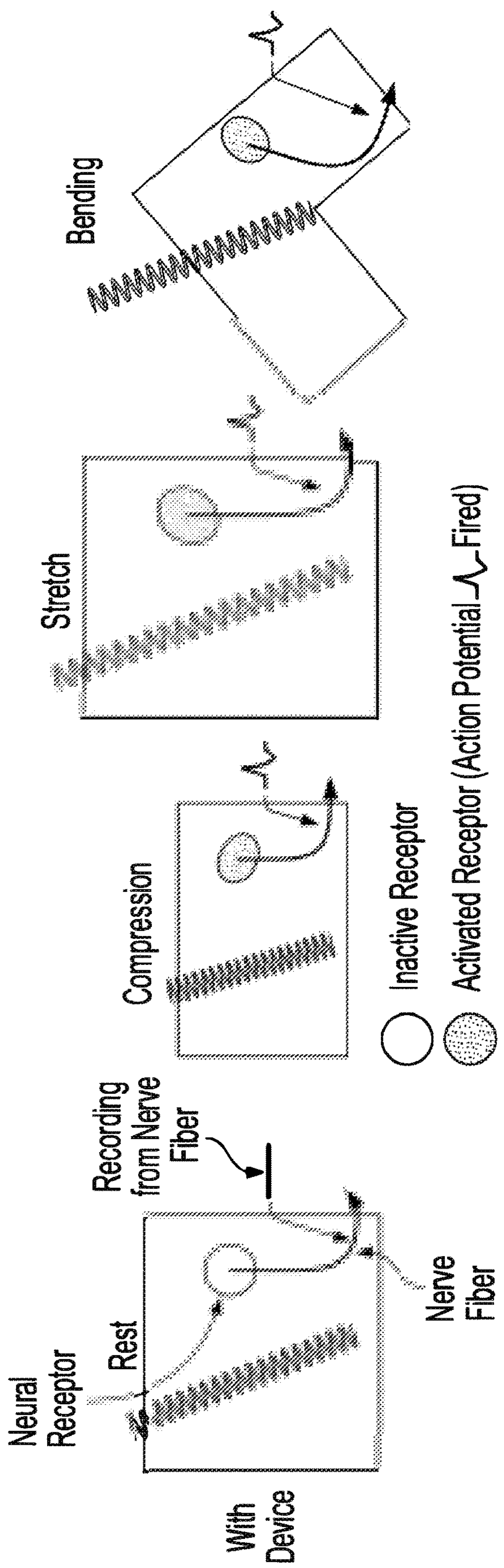
FIG. 12 depicts representative examples of energy from movement with the lead device being operatively positioned in the patient.

The structure, device, or lead, such as a coiled lead, is designed to translate energy (e.g., movements of the animal or human body) into signal(s) that generate(s) pain relief. As a non-limiting example, the introduction and presence of the structure mechanically stimulates neural receptors and/or causes a local tissue response that promotes or provides pain relief (e.g., stretching of the coiled structure leads to stretching and/or increased stretching of stretch receptors that would not otherwise occur without the introduction or presence of the device). As another non-limiting example, the device design can cause, encourage, promote, enable, provoke, or facilitate growth of tissue (e.g., fibrotic tissue) that mechanically connects the system, device, or lead to the appropriate neural receptors that will generate action potentials or neural signals in a method and/or pattern that provides pain relief. The device can thus mechanically stimulate neural receptors to provide pain relief. The mechanical stimulation can cause signals to be generated that are different (e.g., more or less intense, patterned, unique in pattern, etc.) from signals that would be produced in the absence of the system, device, or lead, and are tuned to evoke clinically significant pain relief. The system, device, or lead can amplify, translate, transform, and/or otherwise change the response that neural receptor(s) would have to the same body movement in the absence of the device, such that the energy of a body movement that would have not produced pain relief has been modified, transformed, and/or translated into a form that does produce pain relief. The modification, transformation, and/or translation of the energy and/or forces from the body movement can result in changes to the intensity, waveform (e.g., a mechanical waveform), shape, and/or property(ies) of the energy and/or forces such that they are moved, transposed, and/or delivered in a location that intensifies, modulates, modifies, and/or otherwise changes the response evoked in the neural receptor(s) and/or local tissue to generate signals (e.g., neural signals or other local signaling) that relieve pain. An example of representative images showing movement of the patient without the lead is shown in FIG. 11. An example of representative images showing movement of the patient with the lead or wire inserted in the patient is shown in FIG. 12.

It is to be appreciated that the invention can be designed to have a therapeutic effect and the properties of the device are chosen such that the device will operate within and/or create a therapeutic window. As a non-limiting example, the properties of the device can be chosen such that the device is not rejected by the body and instead causes a healthy, appropriate, and/or desirable amount, type, quantity, proportion, and/or degree of growth and/or ingrowth of tissue in, on, around, and/or near the device (e.g., such that the device elicits a tissue response that is of sufficient magnitude and appropriate characteristics and neither too large nor too small in magnitude or other characteristics) (FIG. 4A et al).

The device is designed to avoid a tissue response that is of a magnitude (e.g., too large) that would or could prevent, mute, dampen, soften, lessen, and/or otherwise reduce the mechanical stimulation and/or signal that is produced by the device, which can prevent the device from mechanically activating neural fiber types that would produce pain relief (e.g., afferent Type I (such as Type Ia and/or Ib) fibers, efferent Act and/or Aγ fibers, motoneurons, their receptors, and/or their endings).

The device is designed to produce a tissue response that is of a sufficient magnitude (e.g., neither too small nor too large), shape, pattern, intensity, and/or other characteristics that can mechanically stimulate, activate and/or cause to activate neural fiber types that would produce pain relief (e.g., afferent Type I (such as Type Ia and/or Ib) fibers, efferent Aα and/or Aγ fibers, motoneurons, their receptors, and/or their endings). The device is designed to produce such a tissue response without producing a neural and/or tissue response that is of a magnitude (e.g., too large), shape, pattern, intensity, and/or other characteristics that can mechanically stimulate, activate and/or cause to activate neural fiber types that would produce unwanted responses, such as new or additional pain (e.g., Type III (A-delta) and/or type IV (C) fibers, or overactivation of efferent fibers such as to cause muscle fatigue, cramping, or other undesirable responses that may be perceived as uncomfortable or painful). Thus, the device is designed to operate within a therapeutic range or therapeutic window (e.g., for mechanical stimulation) that produces desirable, therapeutic, and/or clinically significant responses of pain relief and/or reduction of pain while avoiding producing undesirable responses such as pain, additional pain, tenderness, discomfort, fatigue, cramping, etc.

The system, device, or lead is designed to avoid a tissue response that is of a magnitude (e.g., too small) that would translate, produce, or cause mechanical stimulation and/or signal(s) to be produced by the device that are be insufficient and prevent the device from mechanically activating neural fiber types that would produce pain relief (e.g., afferent Type I (such as Type Ia and/or Ib) fibers, efferent Act and/or Aγ fibers, motoneurons, their receptors, and/or their endings). If the properties and/or characteristics (e.g., mechanical characteristics and/or behavior) of the device match the properties and/or characteristics (e.g., mechanical characteristics and/or behavior) of the tissue too closely then the device may produce a tissue response that is insufficient and/or inappropriate to have the desired effect. If the properties and/or characteristics (e.g., mechanical characteristics and/or behavior) of the device do not match the properties and/or characteristics (e.g., mechanical characteristics and/or behavior) of the tissue closely enough (e.g. sufficiently) then the device may produce a tissue response that is too large (or too small) and/or inappropriate to have the desired effect and/or may cause undesirable effects, such as pain, tenderness, discomfort, fatigue, cramping, device rejection, infection, etc., or may produce an insufficient effect or response. Thus, the device is designed to function and operate within a therapeutic range or therapeutic window to activate and/or mechanically stimulate selectively and/or preferentially the target fibers (e.g., afferent Type I (such as Type Ia and/or Ib) fibers, efferent Act and/or Aγ fibers, motoneurons, their receptors, and/or their endings) and/or tissue response(s) to produce pain relief while avoiding activating and/or mechanically stimulating non-target fibers and/or tissue response(s) that would otherwise produce unwanted responses, such as pain or discomfort.

The properties of the coiled structure, wire(s) or lead(s) are designed to match the tissue sufficiently closely to ensure that the device does not fracture or break while indwelling in the tissue. It is also to be appreciated that the properties of the coiled structure, wire(s) or lead(s) are can also be designed (e.g., intentionally) to produce the appropriate mismatch with the properties of the tissue to ensure that the device produces a response in the tissue that produces pain relief. It is generally understood that the stiffness of a coiled wire lead or spring-like device is directly affected by parameters including, but not limited to, the thickness of the wire, the number of strands in the wire (e.g., if a multi-stranded wire), the thickness of coating(s) on the wire, the density or turn rate or spacing or number of coils, and/or the outer diameter of the coils. As a non-limiting example, increasing the diameter of the wire in a coiled lead will lead to corresponding changes in the stiffness of the spring, coiled lead, and/or cable (or spring-like or cable-like structure). Increasing the stiffness can correspondingly increase the forces generated by the spring, coiled lead, and/or cable (or spring-like or cable-like structure) upon bending, compression, or stretching, and/or the forces required to bend, compress, or stretch the spring, and can cause, enable, produce, elicit, evoke, facilitate, or promote tissue response(s) (e.g., in muscle and/or muscle tissue, adipose and/or adipose tissue, nerve and/or nervous tissue, connective tissue, skin and/or skin tissue, etc.) that lead to reduction of pain and/or other desirable responses. As another non-limiting example, the stiffness of the coiled lead may fall within an optimal range of stiffness that produces a therapeutic window for the desirable effects (e.g., pain relief) of the invention. The therapeutic window may prescribe a coiled lead that is sufficiently stiff so as to exert forces on the surrounding tissue during bending, compression, or stretching of the lead or one or more coils that activate target nerve fibers (e.g., afferent Type I (such as Type Ia and/or Ib) fibers, efferent Act and/or Aγ fibers, motoneurons, their receptors, and/or their endings), but not so stiff that a coiled lead may damage the tissue in which it is placed by resisting bending, compression, or stretching in response to external forces (e.g., such as forces that may occur due to voluntary muscle contraction, or bending of a joint) or exert forces sufficient to activate non-target fibers (e.g., Type III (A-delta) and/or type IV (C) fibers, or overactivation of efferent fibers such as to cause muscle fatigue, cramping, or other undesirable responses that may be perceived as uncomfortable or painful). As another non-limiting example, the properties of the structure may be designed, made, or created such that it matches or approximately matches or approximates the properties of the tissue and healthy tissue response (e.g., fibrotic growth or ingrowth) is prompted, which can include tissue growth around the structure as well as growth in between the coils of the structure because the structure is sufficiently flexible to allow such growth and the tissue that the structure causes, enables, produces, elicits, evokes, facilitates, promotes growth of which, to grow, and/or that grows in, on, around, and/or near the structure is desirably connected to tissue to produce a response to relieve pain via mechanical stimulation (e.g., when the structure compresses, expands, stretches, bends, and/or otherwise moves, changes shape, and/or deforms (e.g., reversibly compresses, expands, stretches, bends, and/or otherwise moves, changes shape, and/or deforms)). Repeated movement and/or changes in shape of the structure can lead to repeated or continuous or approximately continuous mechanical stimulation leading to continuous pain relief.

Generally speaking, and as highlighted in the various possible interactions shown in FIGS. 5A through 10D, energy from movement is transferred into the device and released into the tissue in a manner that relieves pain. The energy from movement may not be sufficient to activate neural receptors in the absence of the device, but introduction of the device and/or tissue growth/ingrowth can transfer energy sufficient to activate one or more neural receptors to relieve pain. Although the indwelling device appears to exert passive effects, the device effectively transfers energy from normal body movements to the local tissues to generate mechanical activation of local tissues, which may produce local or systemic stimulatory effects for pain relief (including activation of action potentials in neural receptors connected to nerve fibers). This may, therefore, allow a patient to remain active while being relieved from the pain previously suffered.

Figure 6A:
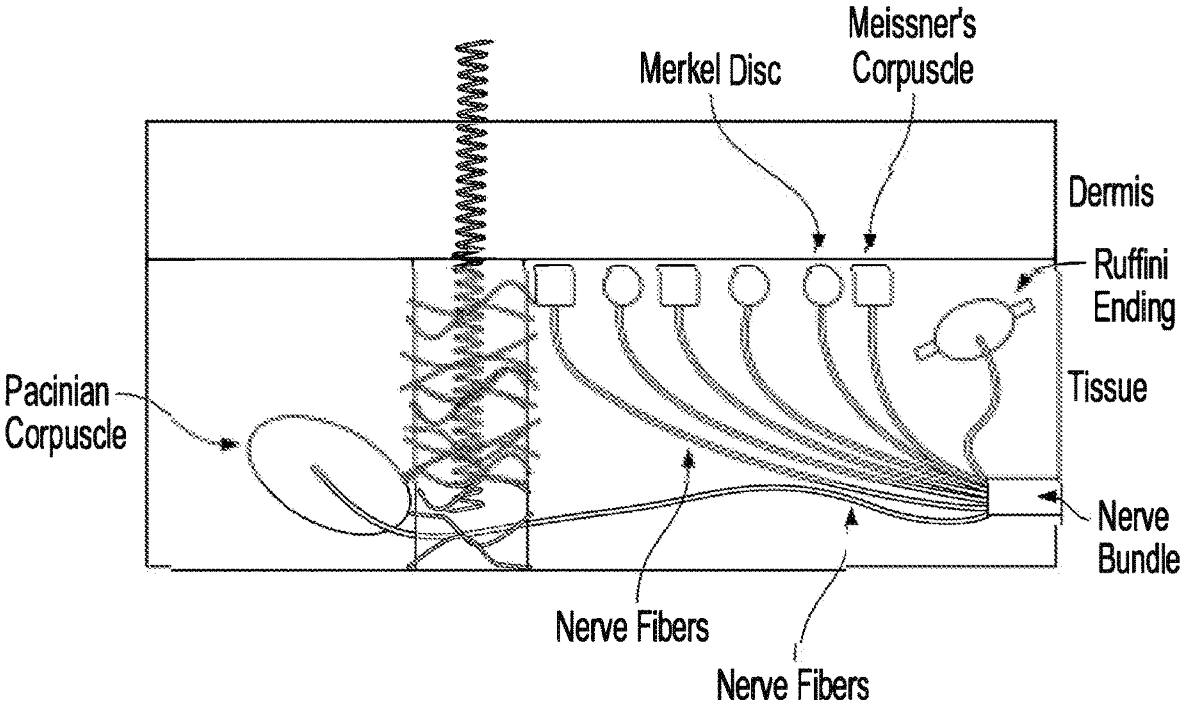
FIGS. 6A-6C are comparable to the view shown in FIG. 3, exemplifying tissue growth/ingrowth in, on, or around the device. Tissue growth can be of different sizes or magnitudes, and can form mechanical linkages (shown by horizontal striations MS) with the surrounding tissues and structures, including neural receptors and tissues and structures that are contiguous with neural receptors.
Figure 6B:
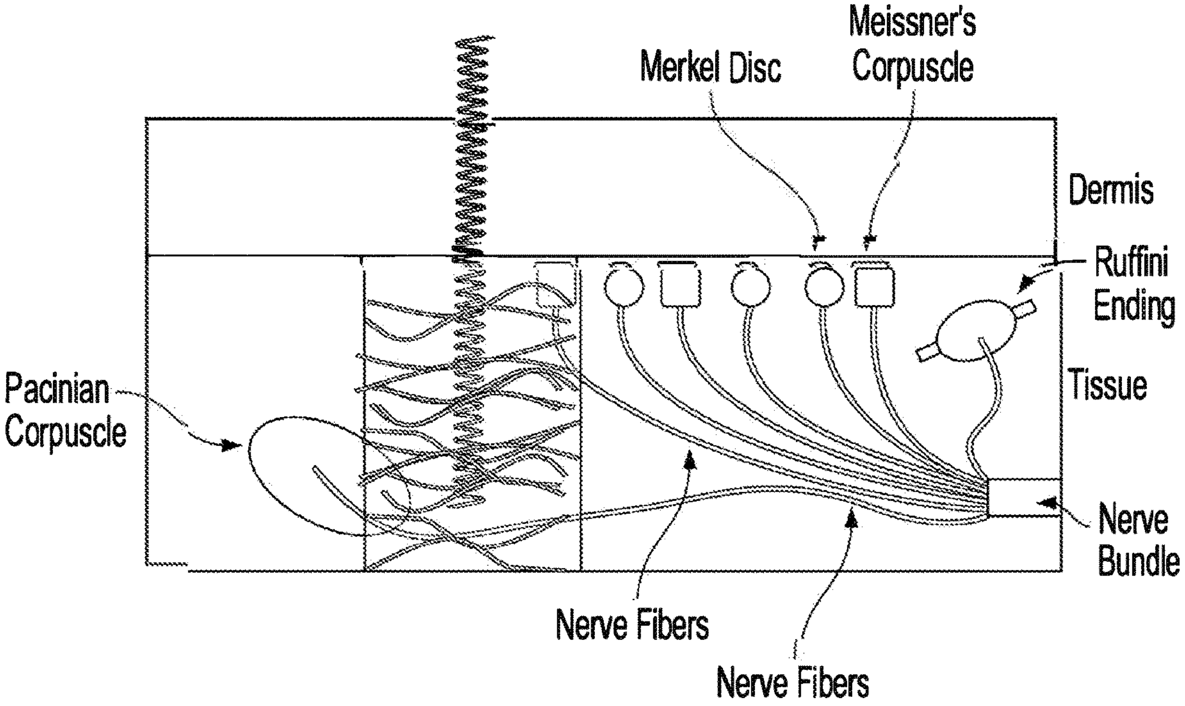
Figure 6C:
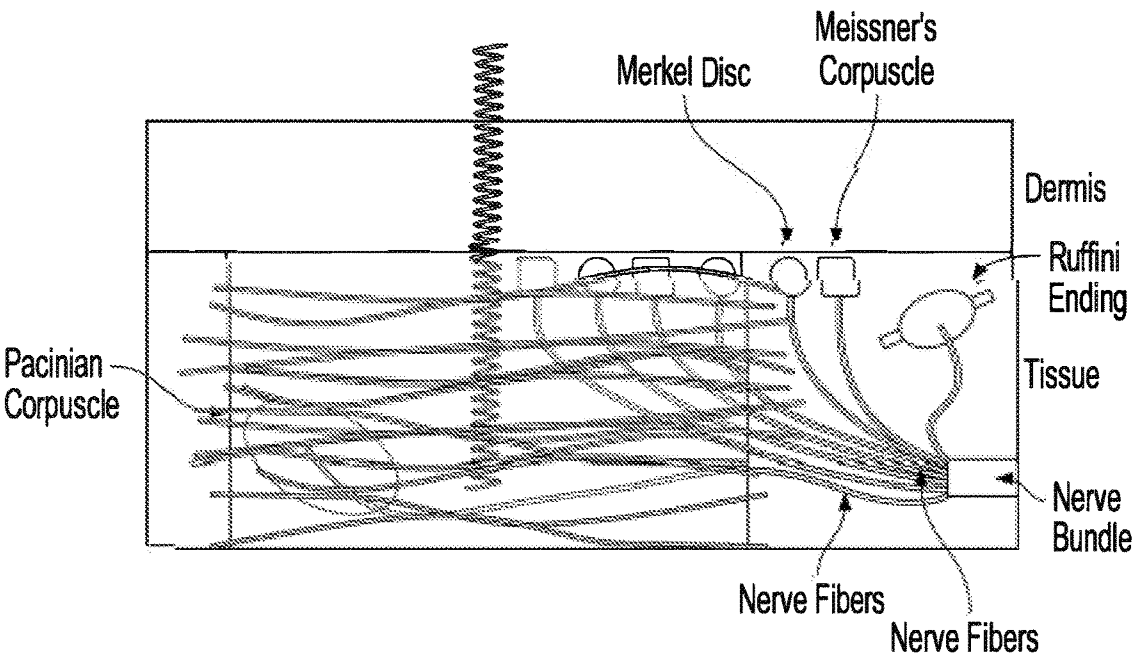
Figure 7:
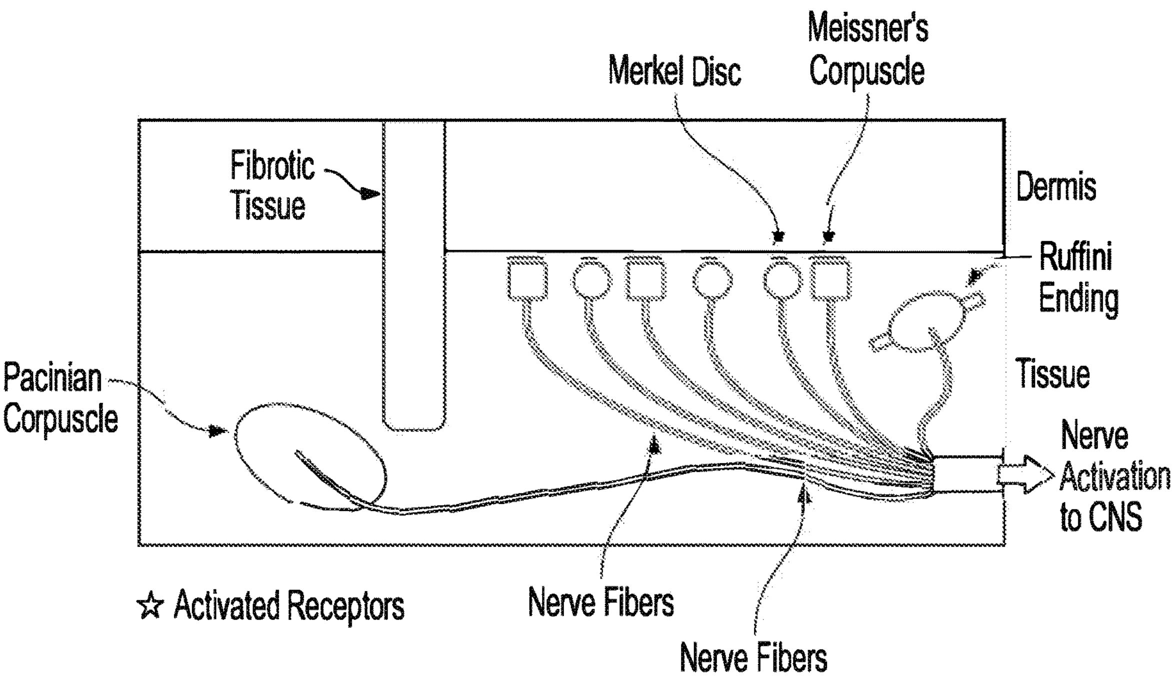
FIG. 7 is comparable to the view shown in FIG. 3, depicts the healthy tissue growth/ingrowth that is left after removal of the device.
Figure 8:
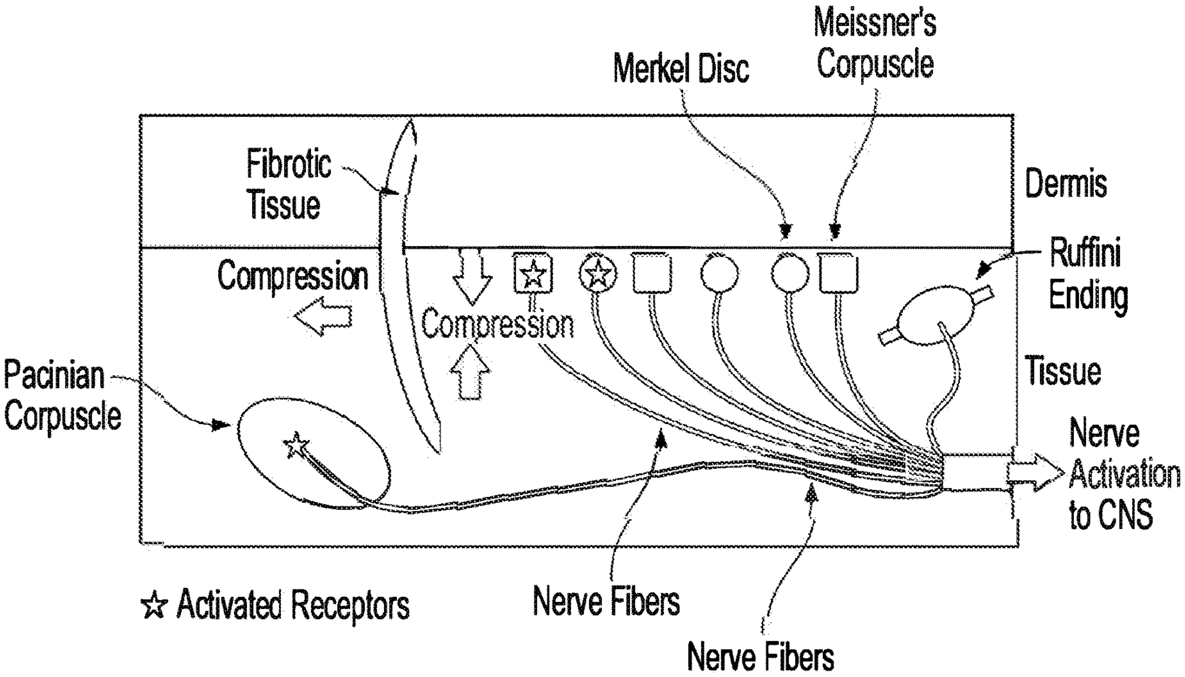
FIG. 8 is comparable to the view shown in FIG. 3, demonstrating how bending, stretching, or compression of the tissue growth/ingrowth remaining after removal of the device may cause stretching or compression of tissue in which nerve endings and receptors are present or mechanically linked, leading to activation of the nerve endings and/or receptors that is transmitted to the CNS and relieves pain.

In all of the side views shown in FIGS. 5A through 10D, a layer of dermis D overlays on tissue T. Various structures are located within the tissue T, including Pacinan corpuscule PC, nerve fibers NF, Merkel discs MD, Meissner's corpuscle MC, Ruffini ending RE, and multiple nerve fibers NF connected to nerve bundle NB. Of course, these views are merely exemplary and not necessarily drawn to scale, so that it will be understood that actual bodily structures may vary. In FIGS. 7 and 8, fibrotic tissue FT is shown in place of lead/structure 100 (visible in the remaining Figures). Also, where shown, the lateral arrows indicate bending, while the pairs of vertical arrows ae indicative of compression (pointing inward) or stretching (pointing in opposing directions) of the lead/structure 100.

Figure 9A:
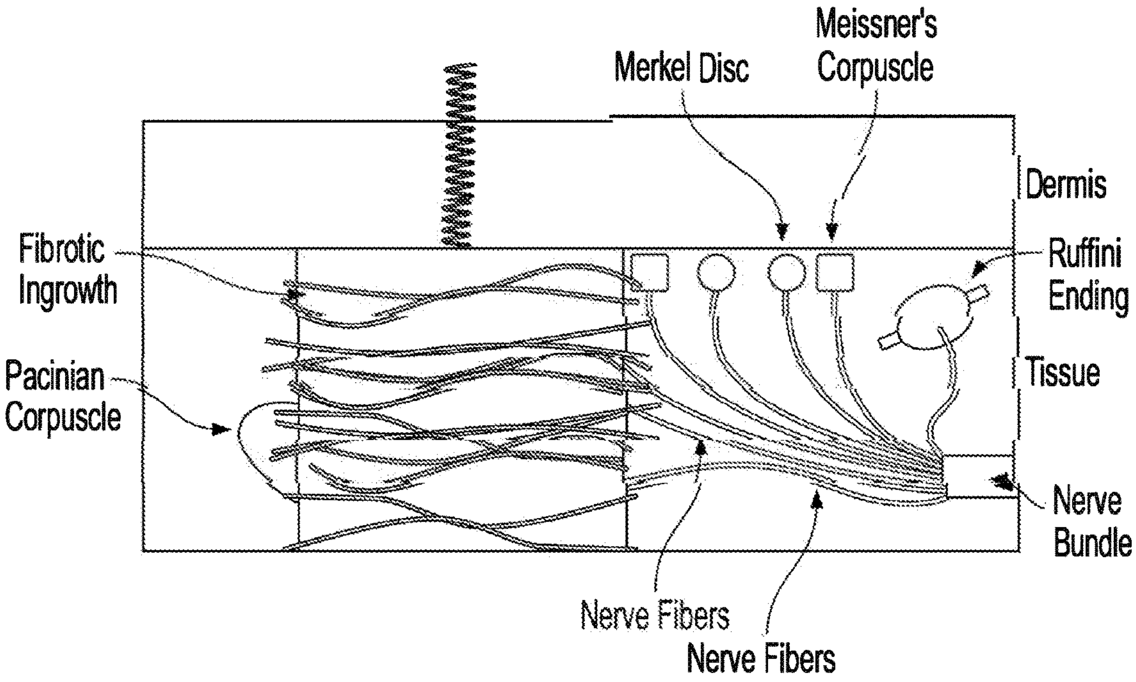
FIGS. 9A and 9B are comparable to the view shown in FIG. 3, with FIG. 9A showing the growth of tissue in, on, or around the device that can mechanically connect the device to neural receptors and FIG. 9B showing the compression of the device, activating one or more neural receptors, such as Pacinian corpuscles, by the device transferring/transducing mechanical forces from the compression to the neural receptor and/or the tissue surrounding the neural receptor.
Figure 9B:
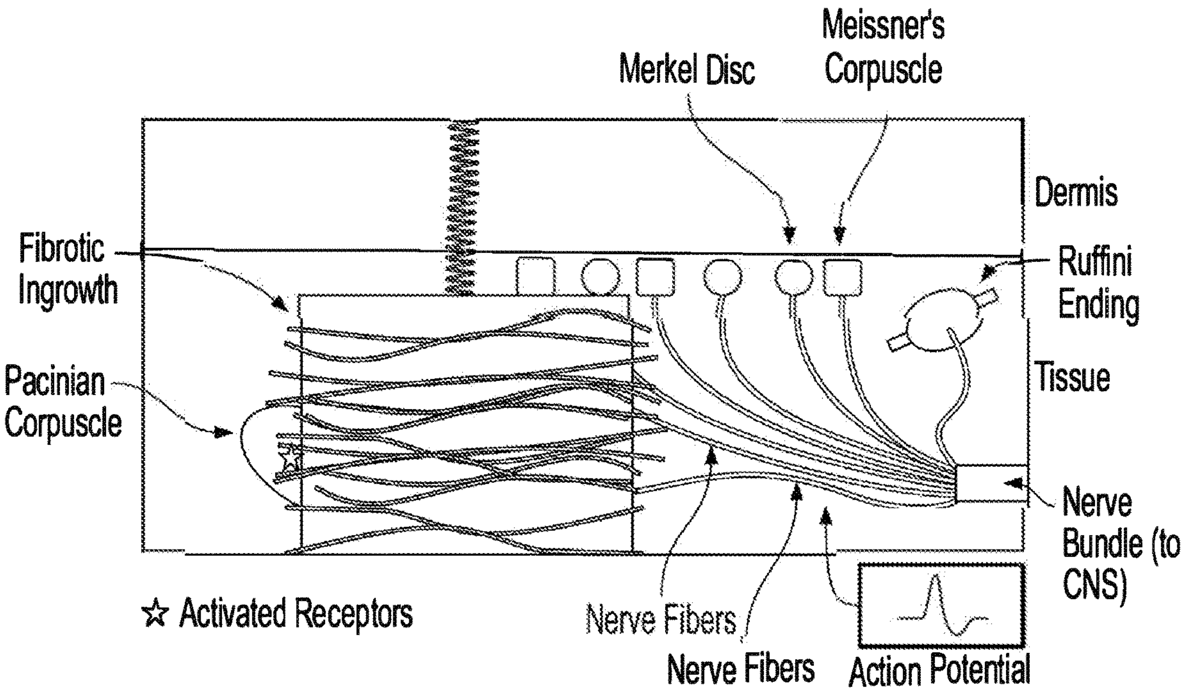
Figure 10A:
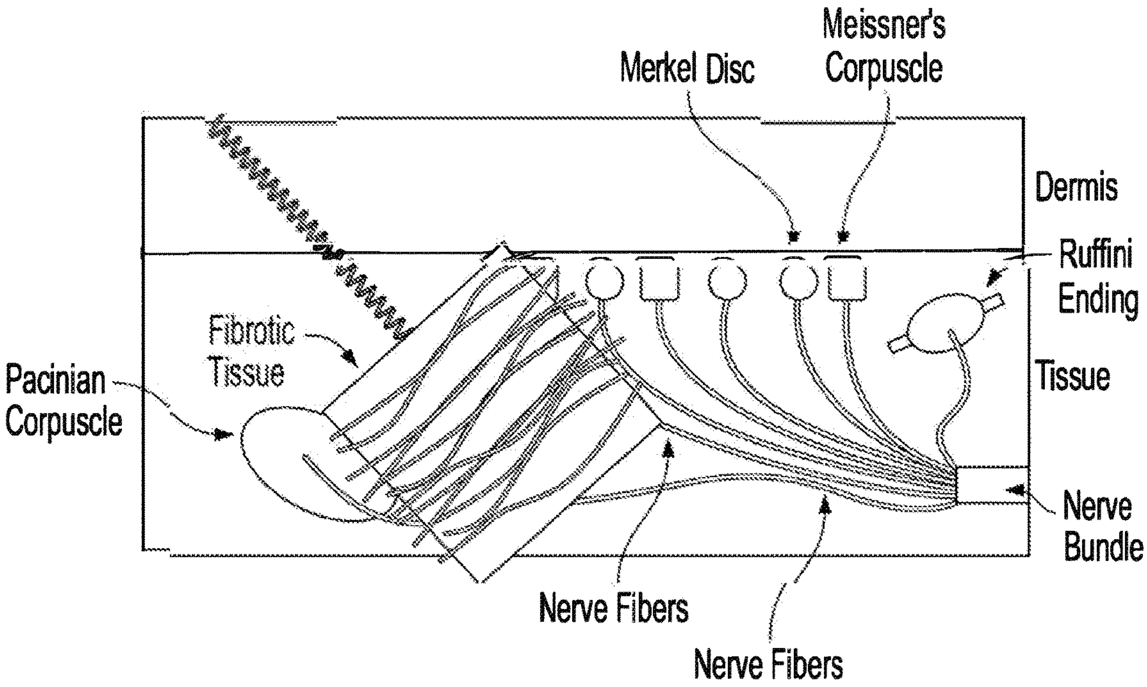
FIGS. 10A through 10D are comparable to the view shown in FIG. 3. The device and/or tissue growth that mechanically connects the device to neural receptors may mechanically stimulate one or more types of receptors, including Pacinian corpuscles (10A and 10B), Merkel discs and Meissner's corpuscles (10A and 10C), and Ruffini endings (10D). Characteristics of the device (e.g., multiple diameters of a coiled lead) \ may be chosen to optimize, for example, tissue growth/ingrowth or mechanical properties of the device and/or pain relief.
Figure 10B:
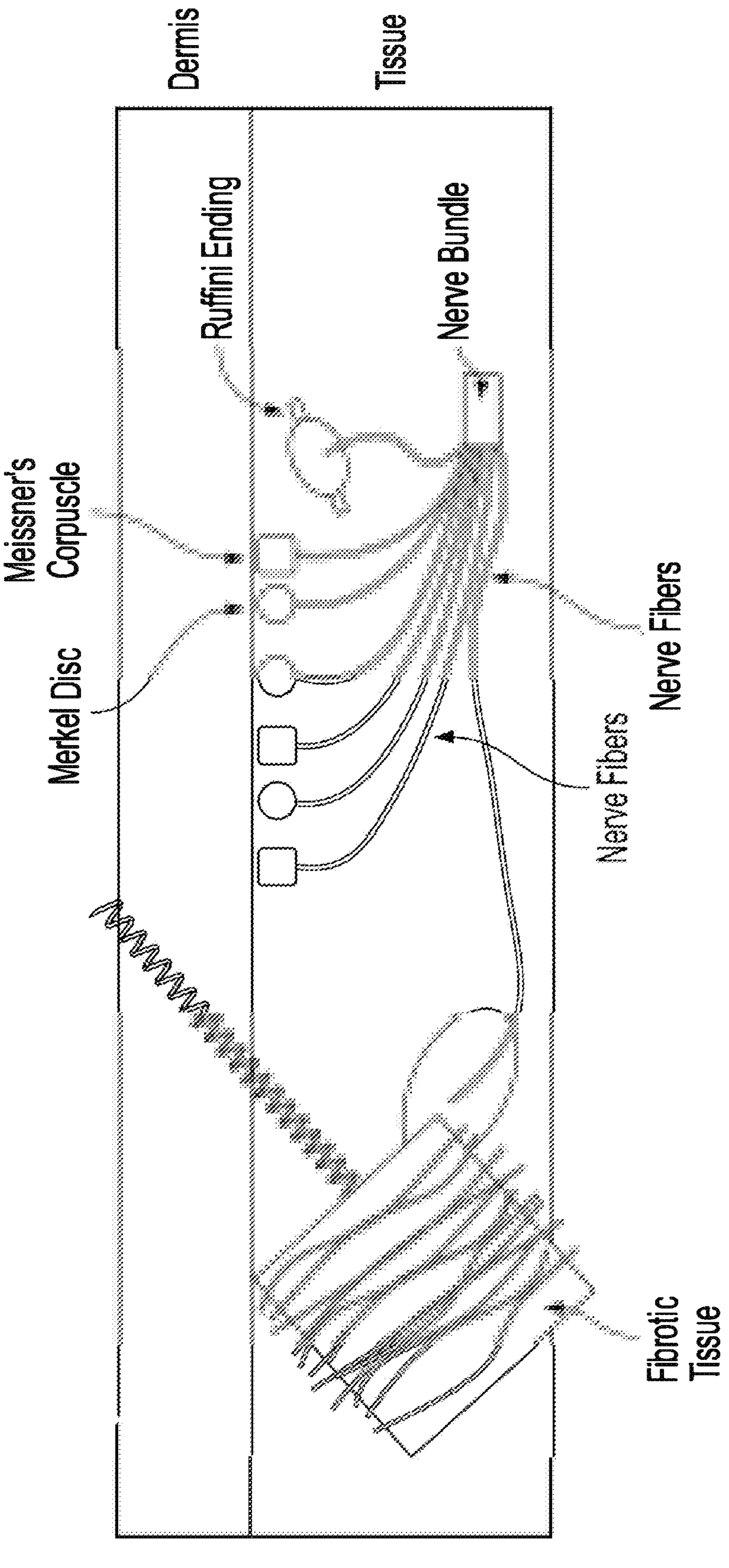
Figure 10C:
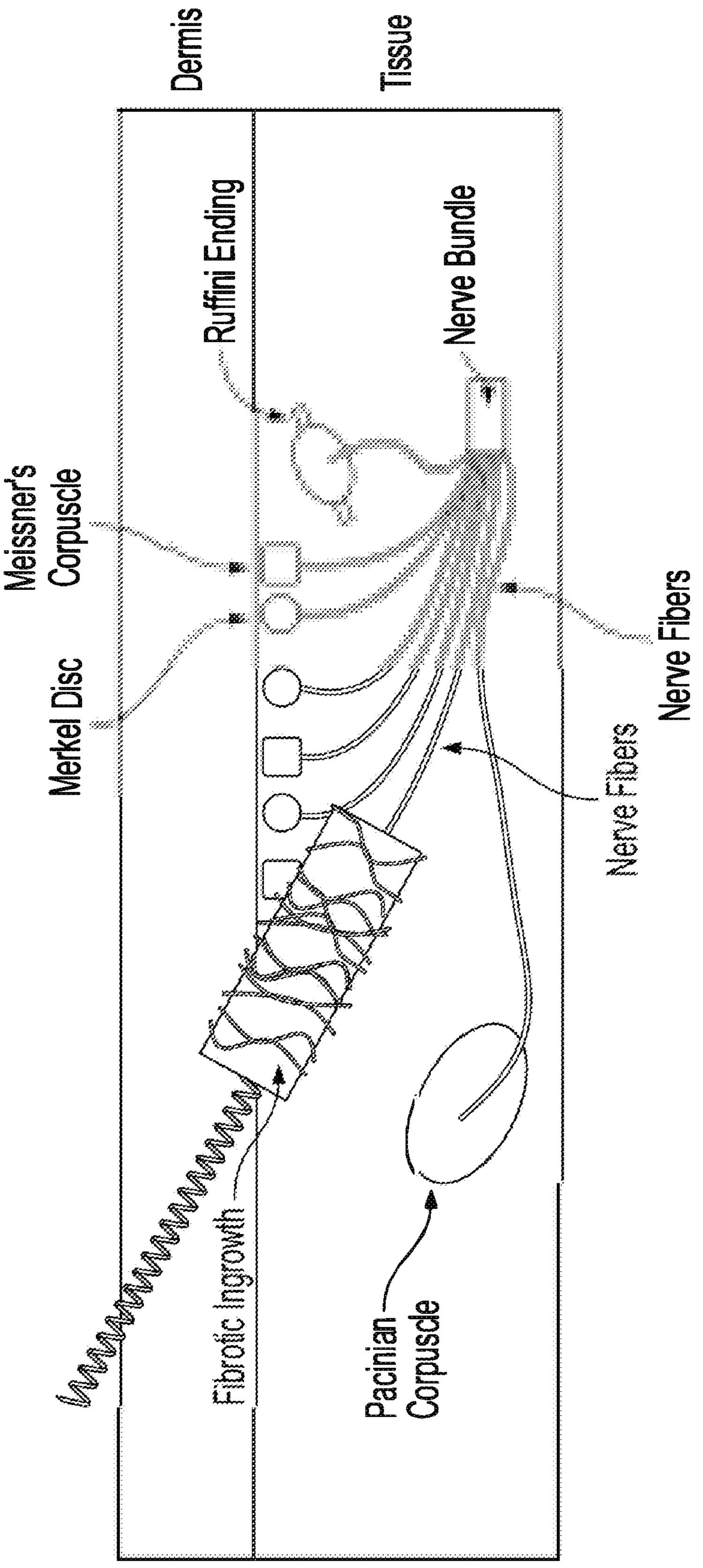
Figure 10D:
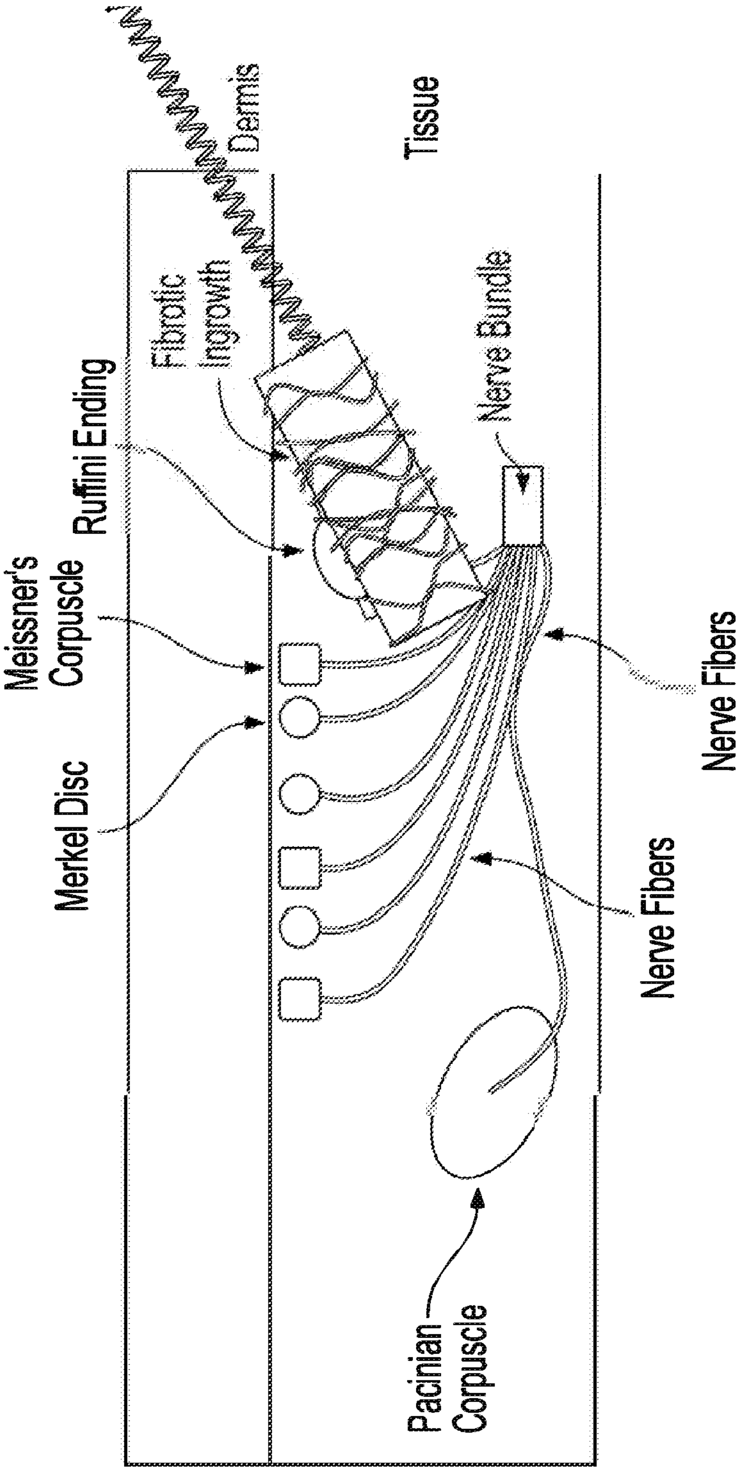

In the same manner, again with reference to some of the time-lapse or sequential aspects shown in the Figures (and particularly FIGS. 5A through 10D), in FIG. 6A, tissue growth/ingrowth can be of different sizes or magnitudes, and can form mechanical linkages (shown by striations) with the surrounding tissues and structures, including tissues and structures that are or are continuous with mechanical receptors in the tissue. In FIG. 6B, tissue growth/ingrowth can be of different sizes or magnitudes, and can form mechanical linkages (shown by striations) with the surrounding tissues and structures, including tissues and structures that are or are continuous with mechanical receptors in the tissue. In FIG. 6C, tissue growth/ingrowth can be of different sizes or magnitudes, and can form mechanical linkages (shown by striations) with the surrounding tissues and structures, including tissues and structures that are or are continuous with mechanical receptors in the tissue. In FIG. 8, tissue growth/ingrowth after removal of the device may continue to translate energy/forces from the body to activate mechanical receptors that would not be activated by the same energy/forces prior to or without the device and/or tissue growth/ingrowth. In FIG. 9A, growth of tissue can mechanically connect the device to neural receptors. In FIG. 9B, compression of the device activates receptors such as Pacinian corpuscle. In FIG. 10A, the device and/or tissue growth that mechanically connects the device to neural receptors may mechanically stimulate one or more types of receptors. In FIG. 10B, the device and/or tissue growth that mechanically connects the device to neural receptors may mechanically stimulate one or more types of receptors, including Pacinian corpuscles. In FIG. 10C, the device and/or tissue growth that mechanically connects the device to neural receptors may mechanically stimulate one or more types of receptors, including Merkel discs and/or Meissner's corpuscles. And in FIG. 10D, The device and/or tissue growth that mechanically connects the device to neural receptors may mechanically stimulate one or more types of receptors, including Ruffini corpuscles/endings.

Prior to this discovery, it was not known how to produce pain relief with this device without stimulating remote to the nerve. The present invention may be used to provide pain relief in regions of the body without the need to administer electrical stimulation. Further, it was not previously known how to manufacture a system that incorporated a three-dimensional (e.g., open coiled) device that could be inserted percutaneously (e.g., through a needle) and left in situ to relieve pain without it being in electrical communication (or supplied with) with a stimulator (or pulse generator that was capable of producing an electrical signal) or being connected to a stimulator that was off and/or not delivering electrical stimulation but still providing or being capable of providing pain relief. Following the discovery that placing the lead and sending patients home without a stimulator can produce pain relief, the present invention is a method and device designed to provide therapeutic relief of pain following insertion into body tissues (e.g., by the activation of local tissues, muscle or nerve fibers) without the use of electrical stimulation. Further, prior to this invention, it was not known how to produce pain relief with this device without delivering electrical stimulation. The device consists of a wire, comprised of a three-dimensional structure, which may be deployed or placed in the body using a needle (e.g., percutaneous insertion) and the left indwelling (e.g., following the removal of the needle), in or around a region of pain.

The three-dimensional structure of the wire or lead may provide prolonged therapeutic effects while indwelling due to the continuous activation (e.g., of a larger volume of tissue that other methods of mechanical stimulation using fine needles) of local tissue. Pain relief may be produced by local effects (e.g., muscle stimulation), depolarization or activation of nerves or electrically-sensitive tissues, or systemic effects. Certain embodiments of the device may include a wire or lead with a coiled, spring-like shape that while indwelling in the tissue is designed to move with the tissue, producing additional activation of local tissue. The design enables transfer of energy that is taken in by system (e.g., body) and released into tissue for the purpose of relieving pain. Further, by encouraging the ingrowth of tissue while the lead is indwelling, the same relative movements are more impactful (e.g., movement of tissue produces additional mechanical interactions and displacement of tissue over time) to produce long-lasting pain relief compared to existing approaches of mechanical stimulation that must be applied repeatedly at office visits. This device avoids need to administer electrical stimulation for the treatment of pain by using an innovative system that takes advantage of normal body movements that the patient is already undergoing or experiencing. By relying on the movement of the body and local tissues, this device avoids the need for the practitioner or clinician to be trained in mechanical stimulation techniques or implantation of electrical stimulation electrodes or devices. Further, some applications of electrical stimulation (e.g., tibial nerve stimulation) require frequent visits for application of electrical stimulation during visits in office and this invention provides a method to overcome this problem by enabling continuous activation of fibers to produce the therapeutic effect. The local tissue remodeling that occurs while the device is indwelling (e.g., scar tissue) or changes in local tissue properties (e.g., to become more rigid) may last long-term following the removal of the device to further sustain the therapeutic effects (e.g., pain relief) of mechanical stimulation following removal of the device. The potential for long-term changes in tissue properties and development of scar tissue may occur due to the indwelling of the lead, which is a significant improvement over previous applications of mechanical stimulation that are administered intermittently and fail to change tissue structure.

In addition to encouraging pain relief during movement and normal activities, the indwelling device produces local activation of nerve fibers or pain relieving activation of other local tissues. Further, this design eliminates the need to power the device with either an external or implanted power source and instead uses the conversion of body movements, which activate local tissues or receptors to produce pain-relieving effects.

In comparison to therapies that use electrical stimulation to provide pain relief, this is a significant improvement because this invention avoids the need to provide additional components (e.g., a stimulator), which must be operated and powered and increase burden on the patient (e.g., inconvenience, technical difficulty). The present invention removes challenges associated with patient compliance with electrical stimulation therapies, as they must operate stimulation in order to receive therapeutic benefit, and following placement of the device in the present invention, the patient burden is negligible (i.e., patient does not have to maintain or operate system to receive benefit). In existing therapies, the only means to interact with the pain-relieving body tissues and fibers is to provide stimulation, however the present invention overcomes this by providing a method and device that, due to the structure of the lead, can activate pain-relieving fibers and local tissues without administering electrical stimulation. Further, pain relief produced by this therapy may also be distinguished from that of electrical stimulation therapies, as the mechanism for pain relief caused by the indwelling lead may occur through inflammatory (e.g., immunological) response activated by local response to presence of the lead (e.g., activation of local mechanisms rather than neural or central mechanisms activated by electrical stimulation).

The advantages of this invention are significant in comparison to acupuncture or dry needling, as this therapy is designed to produce local effects (e.g., muscle stimulation), nerve stimulation (depolarization of excitable tissue), or other systemic effects, but is administered to be indwelling in the body tissue (e.g., allowing continuous therapy during visit and at home, 24 hours per day) and avoids the need for repeated visits to clinic.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A method comprising:

percutaneously implanting a flexible, open-coiled helical lead in a tissue of a body;

permitting fibrotic ingrowth or encapsulation of the flexible, open-coiled helical lead to the body to permit connection of the flexible, open-coiled helical lead to a neural receptor;

after fibrotic ingrowth or encapsulation, allowing transference of energy from movement of the flexible, open-coiled helical lead relative to the tissue without electrical stimulation; and causing mechanical generation of an action potential in at least one of Type Ia and Type Ib target afferent nerve fibers while avoiding generation of action potentials in non-target Type III and IV nerve fibers, wherein the at least one of Type Ia and Type Ib target afferent nerve fibers are located outside a central nervous system of the body.

2. The method according to claim 1, wherein the at least one of Type Ia and Type Ib target afferent nerve fibers are located between the neural receptor and the central nervous system.

3. The method according to claim 1, wherein the at least one of Type Ia and Type Ib target afferent nerve fibers innervate the neural receptor.

4. The method according to claim 1, wherein the neural receptor is a proprioceptor.

5. The method according to claim 1, wherein the at least one of Type Ia and Type Ib target afferent nerve fibers are in neural communication with the neural receptor and are activated at a location that is between the neural receptor and the central nervous system.

6. The method according to claim 5, wherein the neural receptor is a proprioceptor.

7. The method according to claim 1, wherein the non-target Type III and Type IV nerve fibers include efferent nerve fibers.

8. The method according to claim 1, wherein the at least one of Type Ia and Type Ib target afferent nerve fibers are located outside the neural receptor.

9. A method comprising:

percutaneously implanting a flexible, open-coiled helical lead in a tissue of a body;

allowing mechanical connection of the flexible, open-coiled helical lead to a neural receptor in the tissue of the body; and after mechanical connection of the flexible, open-coiled helical lead, mechanically generating an action potential in at least one of Type Ia and Type Ib target afferent nerve fibers located between the neural receptor and a central nervous system and, innervate a proprioceptor, while avoiding generation of action potentials in non-target efferent nerve fibers, wherein the at least one of Type Ia and Type Ib target afferent nerve fibers are located outside the central nervous system of the body, and wherein mechanically generating the action potential occurs through the flexible, open-coiled helical lead transferring energy from movement of the flexible, open-coiled helical lead relative to the tissue and without electrical stimulation to reduce a perception of pain.

10. The method according to claim 9, wherein mechanically generating the action potential comprises stretching of the tissue and activation of nerve endings or the proprioceptor connected to afferent fibers proximate to the tissue.

11. A method of relieving pain comprising:

positioning a stimulation device having an open coil, helical lead in a human tissue proximate to neural receptors of target Type I afferent nerve fibers;

allowing mechanical connection of the open coil, helical lead to a tissue connected to a neural receptor;

allowing transfer of energy from movement of the stimulation device relative to the human tissue, generating an action potential in the target Type I afferent nerve fibers; and wherein generating the action potential does not require electrical stimulation and does not generate action potentials in non-target Type III and/or Type IV afferent nerve fibers.

12. The method of claim 11, wherein the mechanical connection of the stimulation device to the tissue connected to the neural receptor comprises allowing fibrotic ingrowth and/or encapsulation of the open coil, helical lead with the human tissue.

13. The method of claim 12, wherein a proximal section of the open coil, helical lead is positioned outside of the human tissue and is covered by a bandage.

* * * * *